(12) United States Patent
Shaw et al.

(10) Patent No.: US 8,294,953 B2
(45) Date of Patent: Oct. 23, 2012

(54) LOSSLESS COMPRESSION OF COLOR LOOK-UP TABLE VIA HIERARCHICAL DIFFERENTIAL ENCODING OR CELLULAR INTERPOLATIVE PREDICTION

(75) Inventors: Mark Shaw, Meridian, ID (US);
Randall G. Guay, Meridian, ID (US);
Gaurav Sharma, Webster, NY (US);
Aravindh B. S. Rajagopalan, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1056 days.

(21) Appl. No.: 12/244,425

(22) Filed: Oct. 2, 2008

(65) Prior Publication Data
US 2010/0085605 A1   Apr. 8, 2010

Related U.S. Application Data

(60) Provisional application No. 61/054,154, filed on May 18, 2008.

(51) Int. Cl.
*H04N 1/40*   (2006.01)

(52) U.S. Cl. .......... 358/3.23; 358/539; 358/426.13; 382/166; 382/232; 382/238; 382/244

(58) Field of Classification Search .......... None
See application file for complete search history.

(56) References Cited

U.S. PATENT DOCUMENTS

| | | | | |
|---|---|---|---|---|
| 5,583,656 A | * | 12/1996 | Gandhi et al. | 382/234 |
| 5,668,352 A | * | 9/1997 | Christian et al. | 178/18.02 |
| 6,571,015 B1 | * | 5/2003 | Matsuo et al. | 382/232 |
| 6,819,331 B2 | * | 11/2004 | Shih et al. | 345/602 |
| 6,975,767 B1 | * | 12/2005 | Clark | 382/232 |
| 7,050,643 B2 | * | 5/2006 | Malvar | 382/245 |
| 7,400,277 B2 | * | 7/2008 | Perrone et al. | 341/107 |
| 7,424,163 B1 | * | 9/2008 | Ellis et al. | 382/244 |
| 7,705,754 B2 | * | 4/2010 | Perrone et al. | 341/107 |
| 7,826,111 B2 | * | 11/2010 | Won et al. | 358/518 |
| 2007/0195342 A1 | * | 8/2007 | Sugiura et al. | 358/1.9 |
| 2008/0285867 A1 | * | 11/2008 | Kajiwara | 382/233 |

OTHER PUBLICATIONS

S.R.A. Balaji, et al., "Hierarchical compression of color look up tables," Proc. IS&T/SID 15th Color Imaging Conf, Albuquerque, NM, Nov. 5-9, 2007.
K. Sayood, Introduction to Data Compression, Morgan-Kaufmann, 2005, pp. 1-65.
H. Sagan, Space Filling Curves, Springer-Verlag, 1994, pp. 1-29.
J. Ziv et al., "Compression of Individual Sequences via Variable Rate Coding," IEEE Transactions on Information Theory, Sep. 1978.

(Continued)

*Primary Examiner* — Dung Tran

(57) ABSTRACT

A color look-up table (CLUT) is compressed in a lossless manner. The CLUT includes nodes that convert values of a first color space to corresponding values of a second color space. The CLUT is received in a serialized node-by-node manner. For each of some of the nodes, the following is performed in the order in which the nodes are received in the serialized node-by-node manner. First, a difference value is determined that represents compression of a value of the node, in accordance with a hierarchical differential encoding approach or in accordance with a cellular interpolative prediction approach. Second, the difference value is stored in lieu of the value of the node being stored, to compress the value of the node in the lossless manner.

7 Claims, 10 Drawing Sheets

OTHER PUBLICATIONS

S. Vucetic, "A fast algorithm for lossless compression of data tables by reordering," IEEE Procs. on Data Compression Conf., 2006.

G.E. Blelloch, "Introduction to Data Compression," pp. 15-21, Oct. 16, 2001, www.cs.cmu.edu/afs/cs/project/pscico-guyb/realworld/www/compression.pdf.

S. Kamata et al., "A gray image compression using Hilbert scan," IEEE Procs. on ICPR, 1996.

Z. Song et al., "Using Hilbert curve in imaging storing and retrieving," Information Systems, vol. 27, issue 8, pp. 523-536, Dec. 2002.

T. Bially, "Space filling curves: Their generation and their application in bandwidth reduction," IEEE Trans. on Information Theory, Nov. 1969.

J-L Gially, Gzip users manual, www.gnu.org/software/gzip/manual/gzip.html, copyright 2006.

R. Bala, "Device Characterization," Chp 5 in Digital Color Imaging Handbook, G. Sharma Ed (CRC Press 2003), pp. 269-379.

B. Bastani et al., "Sparse cellular neugebauer model for n-ink printers," 14th Color Imaging Conf., 2006.

R. De Queiroz, "Compression of Color images," Chp 8 in Digital Color Imaging Handbook, G. Sharma Ed (CRC Press 2003), pp. 558-588.

7-zip software development kit, www.7-zip.org/sdk.html (v. 4.57 Dec. 12, 2007).

bzip2, www.bzip.org, copyright 2006-2008.

A.N. Netravali, et al. "Digital pictures—representation and compression," 2nd edition, Plenum Press, 1995.

W. Pennebaker et al., "JPEG still image data compression standard," Van Nostrand Reinhold, 1993.

J. Mitchell et al., "MPEG video compression standard," Chapman & Hall, 1996.

B. Haskell et al., "An introduction to MPEG-2," Chapman & Hall, 1996.

V. Bhaskaran et al., "Image and video compression standards," Kluwer Academic Publishers, 1995.

M. Weinberger et al., "The LOCO-I lossless image compression algorithm . . . ", IEEE Transactions on Imaging Processing, 2000.

ISO/IEC 15444-1, Information technology—JPEG 2000 imaging coding system part 1: Core Editing System, 2000.

X. Wu et al., "Context-based, adaptive, lossless image codec," IEEE Trans. Comm. 45 (4), 1997.

M.U. Celik et al., "Gray-level-embedded lossless image compression," 24 Image Communcation, vol. 18, Jul. 2003.

I.H. Witten et al., "Arithmetic coding for data compression," Communications of ACM, 30(6), 1987.

G. Sharma, "Show-through cancellation in scans of duplex printed documents," IEEE Transactions on Image Processing, vol. 10, No. 5, May 2001.

G. Caner et al., "Local image registration by adaptive filterino," IEEE Transactions on Image Processing, Sep. 2006.

T.A. Welch, "A Technique for high performance data compression," Computer vol. 17, Jun. 1984.

A. Lempel et al., "On the complexity of finite sequences," IEEE Trans. Info. Theory, vol. IT-22, 1976.

G.G. Langdon et al., "A simple general binary source code," IEEE Trans. Info. Theory, vol. IT-28, 1982.

J. Rissanen, "Generalized Kraft inequality and arithmetic coding," IBM Journal of Research & Development, vol. 20, 1976.

G.G. Langdon, "An introduction to arithmetic coding,"IBM Journal of Research & Development, vol. 28, 1984.

* cited by examiner

RASTER

C-SCAN

HILBERT

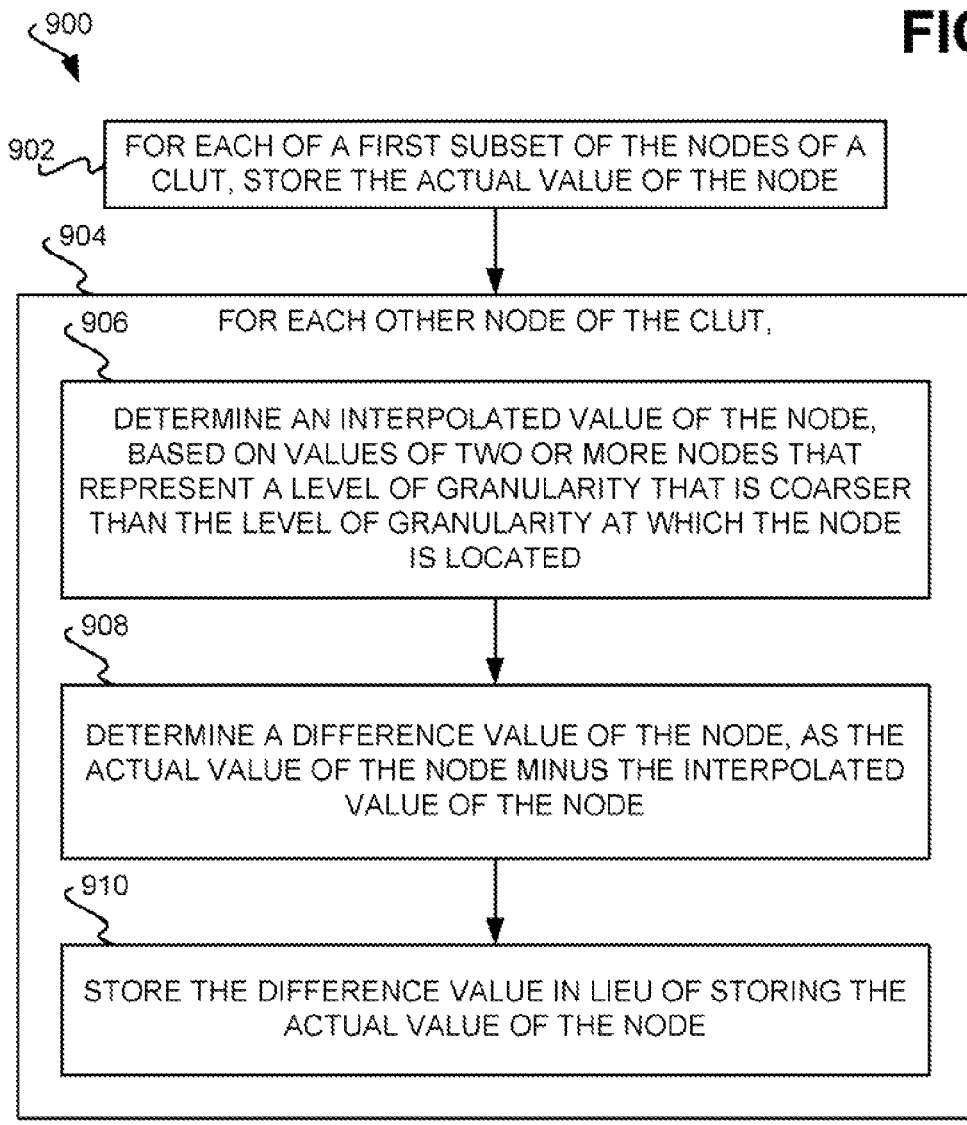

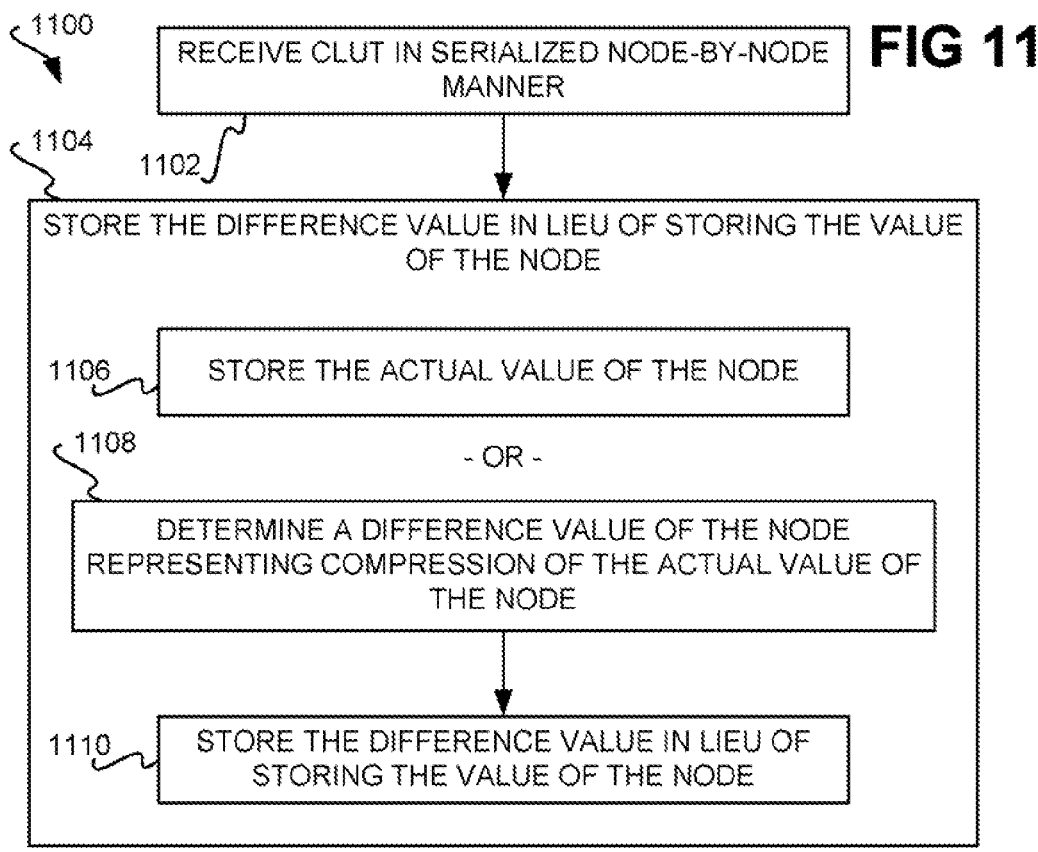
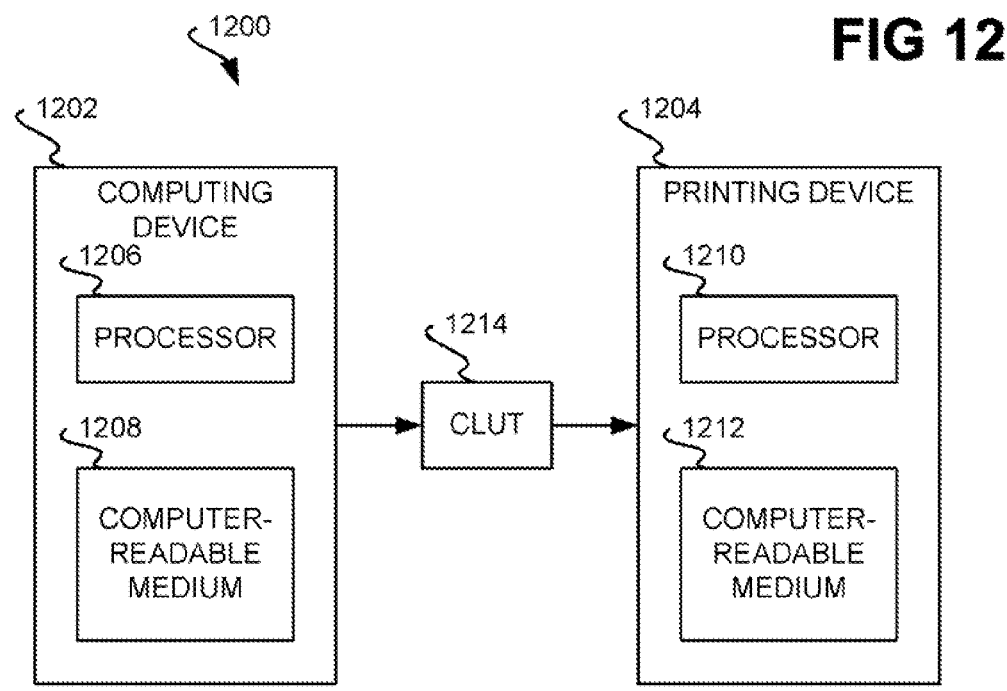

US 8,294,953 B2

LOSSLESS COMPRESSION OF COLOR LOOK-UP TABLE VIA HIERARCHICAL DIFFERENTIAL ENCODING OR CELLULAR INTERPOLATIVE PREDICTION

CROSS REFERENCE TO RELATED APPLICATIONS

This application claims the benefit of provisional patent application Ser. No. 61/054,154; filed May 18, 2008, titled "Lossless Compression Of Color Look-Up Table Via Hierarchical Differential Encoding Or Cellular Interpolative Prediction" which application is incorporated by reference herein as if reproduced in full below.

BACKGROUND

A color space is a system having axes and that describes color numerically. Printing devices commonly employ the cyan-magenta-yellow (CMY) or the cyan-magenta-yellow-black (CMYK) color space, while computing and display devices commonly employ the red-green-blue (RGB) color space. For example, a color represented in the CMY color space has a cyan value, a magenta value, and a yellow value, that combined numerically represent the color.

A color lookup table (CLUT) is a table that converts colors numerically described in one color space to another color space. A CLUT may have a number of nodes. Each node represents a unique combination of color values of a color space from which conversion is desired, and a unique combination of color values of another color space to which conversion is desired. For example, each node of an RGB-to-CMY CLUT includes a unique combination of red, green, and blue color values that represents a color within the RGB color space, and a combination of cyan, magenta, and yellow color values that represents this color within the CMY color space.

A CLUT can be directly mapped, where each node is individually addressable by any possible input value. For instance, for input values having three eight-bit components, a directly mapped CLUT has $(2^8)^3 = 16,777,216$ nodes. Usually such a CLUT is sub-sampled so that a linear interpolation between nodes is sufficiently close to the actual values. Nevertheless, this smaller CLUT can still be quite large.

CLUT's thus can be relatively large, and thus take up relatively large amounts of storage space such as memory. As a result, it can be desirable to compress CLUT's to more efficiently store them. However, existing compression methodologies that are not specific to CLUT's may not optimally compress CLUT's. Furthermore, compression methodologies that are specific to CLUT's may not exist within the prior art.

BRIEF DESCRIPTION OF THE DRAWINGS

FIG. 9 is a flowchart of a method for compressing a CLUT in accordance with a cellular interpolated prediction approach, according to an embodiment of the present disclosure.

FIG. 11 is a flowchart of a method that is more general than and which encompasses the methods of FIGS. 4, 6, and 9, according to an embodiment of the present disclosure.

FIG. 12 is a diagram of a rudimentary system including a computing device and a printing device, according to an embodiment of the present disclosure.

DETAILED DESCRIPTION OF THE DRAWINGS

It is noted that embodiments of the present disclosure as described herein and as portrayed in the figures exemplarily pertain to two-dimensional and three-dimensional data for clarity and other purposes. However, other embodiments of the present disclosure are not so limited. More specifically, the present disclosure is applicable to arbitrary multi-dimensional data, such as four-dimensional data, for instance, as can be appreciated by those of ordinary skill within the art.

Representative Color Lookup Table

Figure 1A:
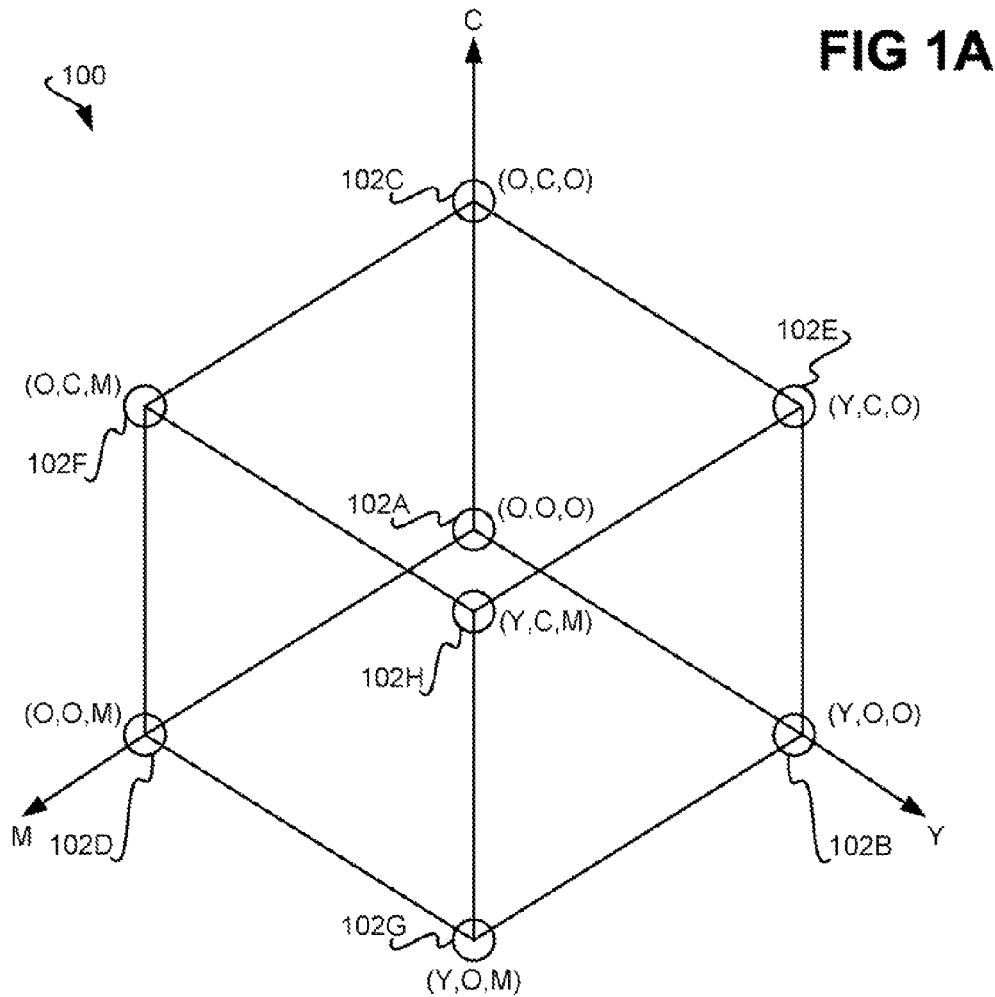
FIGS. 1A and 1B are diagrams of a representative color lookup table (CLUT), according to an embodiment of the present disclosure.
Figure 1B:
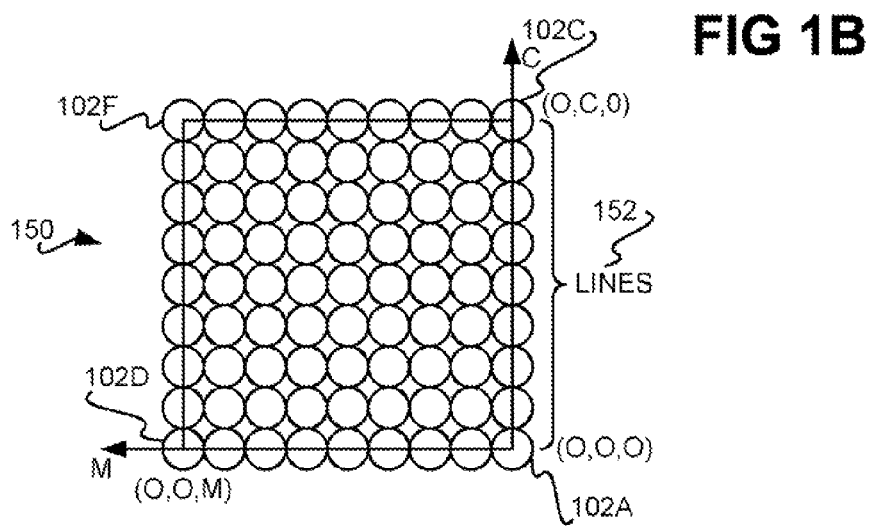

FIGS. 1A and 1B show representative color lookup tables (CLUT's) 100, according to an embodiment of the present disclosure. More specifically, FIG. 1A shows a representative three-dimensional CLUT 100, whereas FIG. 1B shows a single two-dimensional plane 150 of the CLUT 100. The CLUT 100 particularly converts color values from the cyan-magenta-yellow (CMY) color space to another color space, such as the red-green-blue (RGB) color space.

In FIG. 1A, the three-dimensional volume of the CLUT 100 includes a number of nodes organized over the x, y, and z axes corresponding to yellow, cyan, and magenta, respectively, for exemplarily purposes. Each node of the CLUT 100 has a unique combination of cyan, yellow, and magenta color values, and which numerically describes a unique color within the CMY color space. The cyan values range from a minimum value of zero to a maximum value denoted as C; the yellow values range from a minimum value of zero to a maximum value denoted as Y; and, the magenta values range from a minimum value of zero to a maximum value denoted as M.

Eight nodes 102A, 102, 102C, 102D, 102E, 102F, 102G, and 102H, collectively referred to as the nodes 102, are particularly called out in FIG. 1A and are depicted as circles in FIG. 1A. The nodes 102 correspond to the corner nodes of the three-dimensional volume of the CLUT 100. Thus, in order from the node 102A to the node 102H, the nodes 102 correspond to the following (yellow, cyan, magenta) tuples, (0,0,0), (Y,0,0), (0,C,0), (0,0,M), (Y,C,0), (0,C,M), and (Y,C,M).

In FIG. 1B, a particular two-dimensional plane 150 of the CLUT 100 is depicted that encompasses all the nodes of the CLUT 100 that have a yellow value of zero. The nodes of the CLUT 100 are again represented as circles in FIG. 1B The nodes 102A, 102C, 102D, and 102F are particularly called out in FIG. 1B, corresponding to the (yellow, cyan, magenta) tuples (0,0,0), (0,C,0), (0,0,M), and (0,S,M), respectively. The nodes within the two-dimensional plane 150 can be considered as being organized over a number of lines 152, which in the example of FIG. 1B correspond to rows along the y-axis corresponding to cyan.

In one embodiment, the CLUT 100 may convert colors numerically represented in the CMY color space to representation in the red-green-blue (RGB) color space. In such instance, each of the nodes of the CLUT 100 has a combination of red, green, and blue values as well as a unique combination of cyan, magenta, and yellow values. The cyan, magenta, and yellow values of a node represent the unique color in the CMY color space, whereas the red, green, and blue values of the node represent this color in the RGB color space.

As a result, the CLUT 100 permits conversion of colors numerically represented in the CMY color space to instead being represented in the RGB color space. The node having the unique combination of cyan, magenta, and yellow values of the color to be converted to the RGB color space is located within the CLUT 100. The red, green, and blue values of this node provide the corresponding numerical representation of this color within the RGB color space. In this way, colors numerically represented in the CMY color space are converted to numerical representation in the RGB color space using the CLUT 100.

It is noted that a value of the CMY color space within the CLUT 100 refers to the combination of cyan, magenta, and yellow values of a node within the CLUT 100. Likewise, it is noted that a value of the RGB color space within the CLUT 100 refers to the combination of red, green, and blue values of a node within the CLUT 100. Therefore, each node of the CLUT 100 can be said to convert a unique value of the CMY color space to a corresponding value of the RGB color space.

The CLUT 100 is a representative CLUT that converts values of the CMY color space to corresponding values of the RGB color space, and which can be employed in conjunction with embodiments of the present disclosure. More generally, a CLUT converts values of a first color space to corresponding values of a second color space. The CLUT 100 is specifically a three-dimensional volume because its "first" color space the CMY color space—has three color components: cyan, magenta, and yellow.

Other CLUT's may have less or more than three dimensions, however. For example, a CLUT converting values of a cyan-magenta-yellow-black (CMYK) color space to corresponding values of another color space is four-dimensional because the CMYK color space has four color components: cyan, magenta, yellow, and black. Where a CLUT converts values of a first color space to corresponding values of a second color space, the number of components of the first color space is independent of (and thus can be equal to or different than) the number of components of the second color space.

Embodiments of the present disclosure are particularly concerned with compressing a CLUT in a lossless manner. Lossless compression ensures that a compressed CLUT is able to be decompressed without any loss. That is, the decompressed CLUT and the original CLUT that is compressed are identical. Lossless compression of data compares to lossy compression of data, in which some of the original data is lost during compression and cannot be restored when the compressed data is decompressed.

Three approaches to lossless CLUT compression are presented herein: non-recursive hierarchical differential encoding; recursive hierarchical differential encoding, and cellular interpolative prediction. Each of these lossless CLUT compression techniques is now described in detail. Approaches for serializing the nodes of a CLUT for both non-recursive and recursive hierarchical differential encoding, as well approaches for serializing the nodes for cellular interpolative prediction, are also described in detail.

General Difference Value Approach to Compressing CLUT Nodes

Figure 2A:
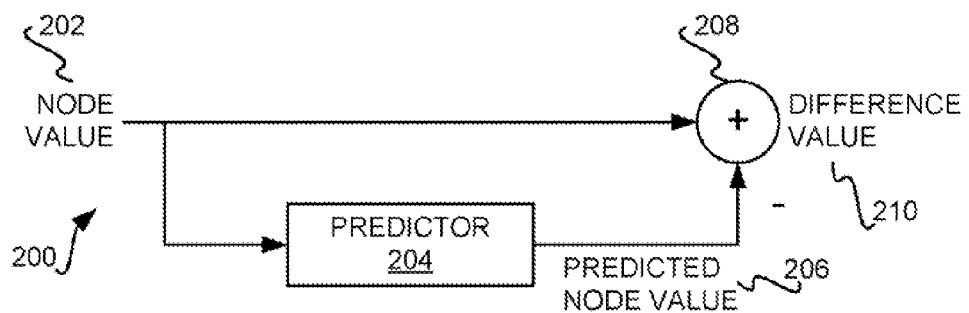
FIGS. 2A and 2B are diagrams of a general difference value approach for compression of a CLUT and for decompression of a compressed CLUT, respectively, according to an embodiment of the present disclosure.

FIG. 2A shows a general difference value approach 200 that can be employed to compressing a color lookup table (CLUT) node, according to an embodiment of the present disclosure. The CLUT converts unique values of a first color space to corresponding values of a second color space, such that each node of the CLUT converts a unique value of the first color space to a corresponding value of the second color space. The general approach 200 encompasses the non-recursive and the recursive hierarchical differential encoding approaches and the cellular interpolative prediction approach that are described later in the detailed description.

The general difference value approach 200 receives a node value 202. The value 202 is the value of a node of a CLUT, and may be considered the value of the second color space that the node in question includes. For example, where the CLUT converts cyan-magenta-yellow (CMY) color space values to corresponding red-green-blue (RGB) color space values, the node value 202 is or encompasses a combination of red, green, and blue values that corresponding to a unique combination of cyan, magenta, and yellow values that the node in question represents.

The node value 202 is input into a predictor 204. The predictor 204 is a component, implemented in hardware, software, or a combination of hardware and software, that generates a predicted node value 206 for the node having the node value 202. The predicted node value 206, however, differs from the node value 202 by a difference value 210, which may also be referred to as an error residual. That is, the difference value 210 plus the predicted node value 206 equals the node value 202.

To generate the difference value 210, the predicted node value 206 is subtracted from the node value 202, as indicated by the operator 208, which may also be implemented in hardware, software, or a combination of hardware and software. For typical CLUT's, the difference value 210 is likely to be smaller than the node value 202 itself. Therefore the difference value 210 can be stored using less storage space than the node value 202 uses (i.e., fewer bytes or bits of memory).

To compress a CLUT then, the general difference value approach 200 is applied to the value of each node of a subset of the nodes of the CLUT. The difference value of each of these nodes is stored within a computer-readable medium like a hard disk drive or semiconductor memory, in lieu of storing the values of these nodes themselves. Any technique for compression of serial data streams, either currently known or subsequently invented, may then be applied to the sequence of difference values obtained from the aforementioned process. The difference values exhibit lesser variability than the unprocessed CLUT values and therefore these method for compression of serial data streams, compress them, statistically speaking, to smaller sizes than the original unprocessed CLUT values. In this way, the storage space needed to store the CLUT is reduced.

Figure 2B:
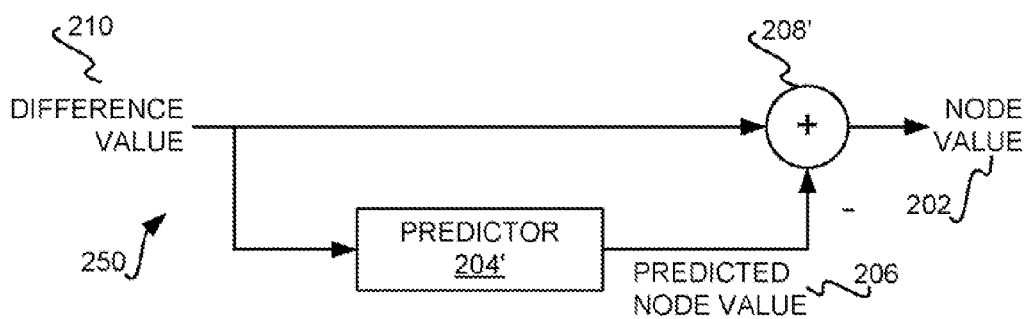

FIG. 2B shows a corresponding general difference value approach 250 that can be employed to decompress a CLUT node that has been compressed using the approach 200 of FIG. 2A, according to an embodiment of the present disclosure, after the sequence of difference values has been recovered utilizing the data decompression algorithm corresponding to the compression algorithm used at the encoder. The general difference value approach 250 receives the difference value 210 that has been generated using the approach 200. The difference value 210 is input into a predictor 204 that corresponds to the predictor 204 of FIG. 2A, and which also may be implemented in hardware, software, or a combination of hardware and software.

Similar to the predictor 204 of FIG. 2A generates the predicted node value 206 for the node having the node value 202, the corresponding predictor 204' generates the predicted node value 206 for the node having the node value 202, but based at least on the difference value 210. To generate the node value 202, the predicted node value 206 is added to the difference value 210, as indicated by the operator 208', which may also be implemented in hardware, software, or a combination of hardware and software. In this way, the node value 202 is generated, or decompressed, from the difference value 210 for the node in question.

Three particular approaches as to how the difference value 210 can be generated in FIG. 2A, and thus how the predictor 204 can be implemented, are now described: a non-recursive hierarchical differential encoding approach, a recursive hierarchical differential encoding approach, and a cellular interpolative prediction approach. Those of ordinary skill within the art can appreciate that such description of how the difference value 210 can be generated, and how the predictor 204 can be implemented, lends itself to corresponding straightforward implementation of the predictor 204' by which the predicted node value 206 is generated for ultimate determination of the node value 202 in FIG. 2B. As such, description of how the node value 202 can be generated in FIG. 2B, and how the predictor 204' can be implemented, is omitted herein to avoid redundancy.

Non-Recursive Hierarchical Differential Encoding Approach

Figure 3:
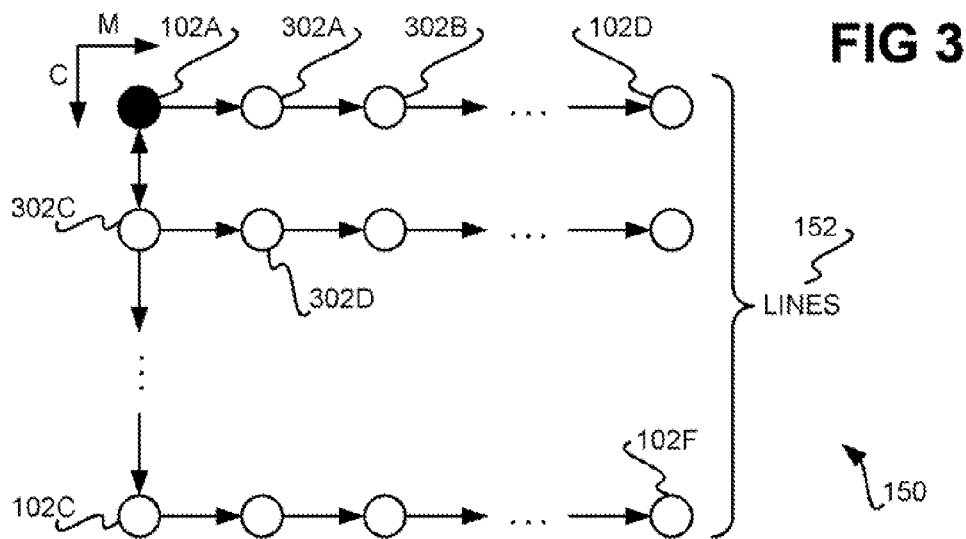
FIG. 3 is a diagram of a plane of a representative CLUT, in relation to which a non-recursive hierarchical differential encoding approach for compressing the CLUT is illustrated, according to an embodiment of the present disclosure.

FIG. 3 illustrates a non-recursive hierarchical differential encoding approach for compressing the nodes of a color lookup table (CLUT), in relation to the representative plane 150 of FIG. 1B of the CLUT 100 of FIG. 1A, according to an embodiment of the disclosure. It is noted that the x-axis and the y-axis corresponding to magenta and cyan, respectively, have been modified to point to the right and down in FIG. 3 as opposed to pointing to the left and up in FIG. 1B, for illustrative and descriptive convenience. Besides the nodes 102A, 102C, 102D, and 102F being called out, additional nodes 302A, 302B, 302C, and 302D, collectively referred to as the nodes 302, are also called out in FIG. 3.

In the non-recursive hierarchical differential approach in the example of FIG. 3, the value of the node 102A is actually stored in the compressed representation of the two-dimensional plane 150 of the CLUT 100. By comparison, the difference values of all the other nodes of the two-dimensional plane 150 are stored in the compressed representation of the plane 150 of the CLUT 100. This distinction is indicated in FIG. 3 by the node 102A being solid, and all the other nodes being hollow.

The non-recursive hierarchical differential approach can be performed over the lines 152 on a line-by-line basis as follows in relation to the example of FIG. 3. In the first line, the predicted value of the node 302A is determined based on the actual value of the node 102A, which precedes the node 302A, and the difference value for the node 302A is determined and stored. Likewise, the predicted value of the node 302B is determined based on the actual value of the node 302A, and the difference value for the node 302B is determined and stored. This process continues for each of the remaining nodes within the line ending at the node 102D.

In the second line, the predicted value of the node 302C is determined based on the actual value of the node 102A, which precedes the node 302C, and the difference value for the node 302C is determined and stored. Likewise, the predicted value of the node 302D is determined, and the difference value for the node 302D is determined and stored. In one embodiment, the predicted value of the node 302D is determined based on the actual value of the node 302C (as specifically shown in FIG. 3), which precedes the node 302D to the left. In another embodiment however, the predicted value of the node 302CD is determined based on the actual value of the node 302A, which precedes the node 302D directly upwards.

This process continues for each of the remaining nodes within the second line, and then with each of the nodes within the remaining lines of the plane 150, until all the nodes within the plane 150 have been processed. The non-recursive hierarchical differential approach is then repeated for the nodes of each other plane of the CLUT 100 of FIG. 1. In this way, the non-recursive hierarchical differential approach is used to compress the CLUT 100 in a lossless manner.

As has been noted, the origin node 102A of the plane 150, corresponding to the tuple (0,0,0), has its value stored without compression, and all the other nodes of the plane 150 are stored in a compressed manner, by storing their difference values in lieu of their (actual) values. Planes successive to the plane 150 have origin nodes corresponding to tuples (1,0,0), (2,0,0), . . . , (Y,0,0). In one embodiment, the origin node of each of these successive planes may also have its value stored without compression, and all the other nodes of the plane in question stored in a compressed manner.

In another embodiment, however, the origin node of each plane successive to the plane 150 is stored in a compressed manner, such that for the entire CLUT 100, just the node 102A has its value stored without compression. For example, the origin node corresponding to the tuple (1,0,0) may have its predicted node value generated based on the actual value of the origin node 102A corresponding to the tuple (0,0,0), and the difference value for this former origin node determined and stored. Likewise, the origin node corresponding to the tuple (2,0,0) may have its predicted node value generated based on the actual value of the origin node corresponding to the tuple (1,0,0). In general the origin node corresponding to the tuple (y,0,0) may have its predicted value generated based on the actual value of the original node corresponding to the tuple (y−1,0,0).

Furthermore, it is noted that in one simple embodiment, the predicted node value of a given node is equal to the value of a preceding node that has already been processed. In the example of FIG. 3, for instance, the predicted value of the node 302A is the actual value of the node 102A, the predicted value of the node 302B is the actual value of the node 302A, the predicted value of the node 302C is the actual value of the node 102A, and so on. This simple implementation of the predictor 204 of FIG. 2A nevertheless achieves good compression results, due to the substantially continuous, smooth, and non-abrupt transformational nature of typical CLUT's. That is, the value of a given node within a typical CLUT is likely to be substantially (albeit not completely) identical to the value of an immediately adjacent node. This characteristic of the CLUT can be expressed by stating that the values of immediately adjacent node are highly correlated.

The CLUT compression approach that has been exemplarily described in relation to FIG. 3 is a hierarchical approach in that it leverages the hierarchical nature of CLUT's described in the preceding paragraph. That is, insofar as the values of immediately adjacent nodes are highly correlated, the hierarchy of a CLUT having different hierarchical node, linear, planar, and/or volumetric levels is taken into account when determining (and storing) the difference values for the vast majority of the nodes of the CLUT. The CLUT compression approach also is non-recursive in that the difference values themselves are not determined recursively; each difference value is determined as the difference between the actual value of a node and the predicted value of the node, and not based on any other difference value that has already been determined. That is, no "differences of differences" are determined.

Furthermore, the CLUT compression approach that has been exemplailry described in relation to FIG. 3 is a differential encoding approach as follows. The differences along the axis corresponding to magenta in FIG. 3 may be considered as approximating the first-order partial derivative $$\frac{\delta}{\delta M},$$

and the differences along the axis corresponding to cyan in FIG. 3 may be considered as approximating the first-order partial derivative $$\frac{\delta}{\delta C}.$$

Likewise, the differences along the axis corresponding to yellow in FIG. 1A may be considered as approximating the first-order partial derivative $$\frac{\delta}{\delta Y}.$$

In this way, the CLUT compression approach that has been described differentially encodes the differences on a node-by-node basis within the CLUT.

Figure 4:
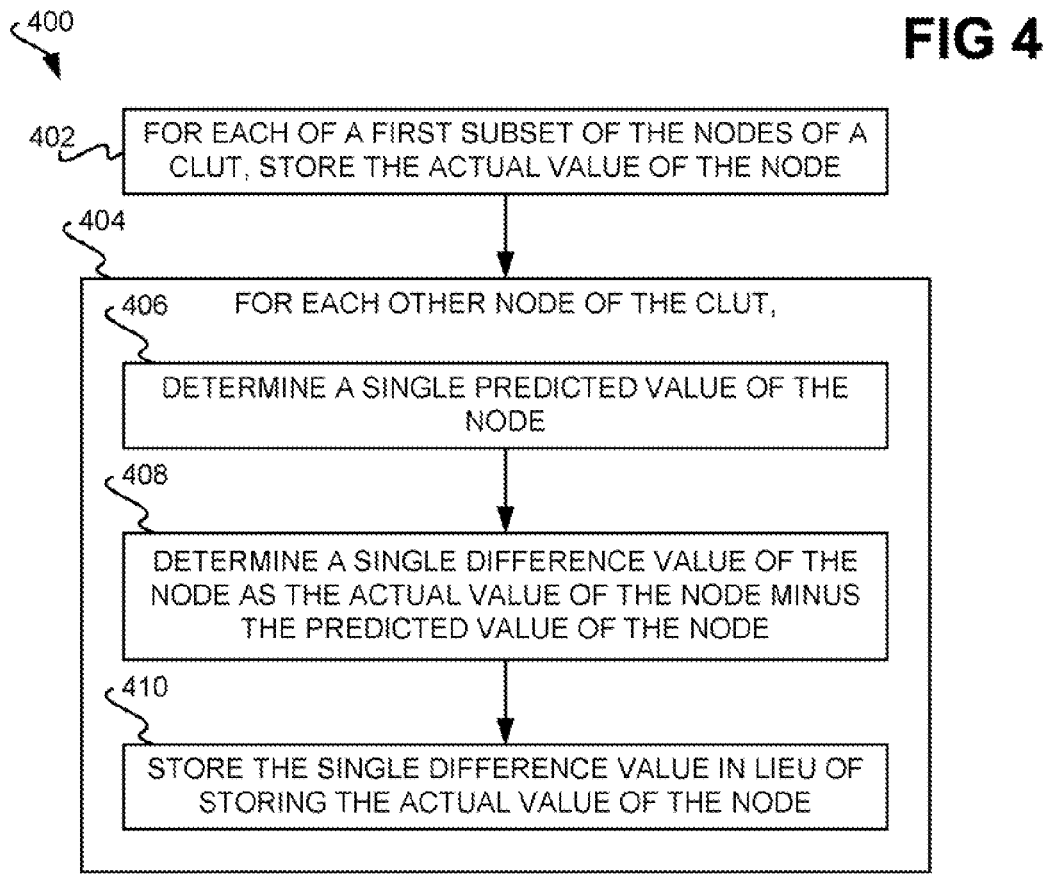
FIG. 4 is a flowchart of a method for compressing a CLUT in accordance with a non-recursive hierarchical differential encoding approach, according to an embodiment of the present disclosure.

FIG. 4 shows a method 400 that summarizes the non-recursive differential encoding approach for compressing a CLUT in a lossless manner and that has been exemplarily described in relation to FIG. 3, according to an embodiment of the present disclosure. For each node of a first subset of the nodes of the CLUT, the actual value of the node is stored on a computer-readable medium as part of the compressed representation of the CLUT (402). This subset of the nodes includes at least one node of the CLUT, such as the origin node of the first plane of the CLUT that is processed. This subset may also include at least one node of each other plane of the CLUT.

Thereafter, the following is performed for every other node of the CLUT (404). First, a single predicted value of the node is determined (406). As has been described, this predicted value may be equal to the actual value of an immediately adjacent node, or may otherwise be based on the actual values of one or more nodes that have already been processed. A single difference value of the node is then determined as the actual value of the node minus the predicted value of the node (408). This single difference value is then stored on the computer-readable medium as part of the compressed representation of the CLUT (410), in lieu of storing the actual value of the node.

Recursive Hierarchical Differential Encoding Approach

Figure 5:
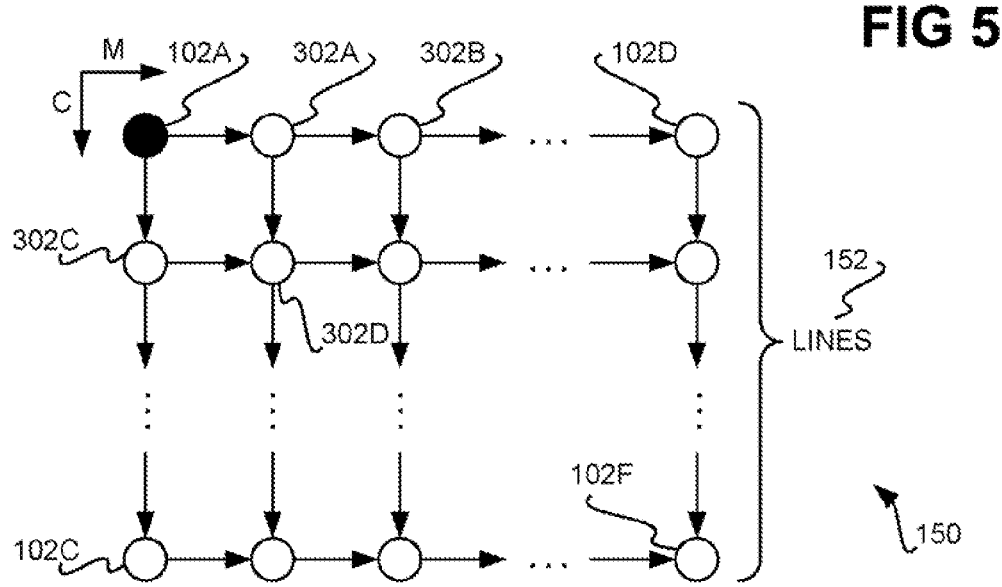
FIG. 5 is a diagram of a plane of a representative CLUT, in relation to which a recursive hierarchical differential encoding approach for compressing the CLUT is illustrated, according to an embodiment of the present disclosure.

FIG. 5 illustrates a recursive hierarchical differential encoding approach for compressing the nodes of a color lookup table (CLUT), in relation to the representative plane 150 of FIG. 1B of the CLUT 100 of FIG. 1A, according to an embodiment of the disclosure. As in FIG. 3 it is noted that the x-axis and the y-axis corresponding to magenta and cyan, respectively, have been modified to point to the right and down in FIG. 5 as opposed to pointing to the left and up in FIG. 1B. Also as in FIG. 3, the nodes 102A, 102C, 102D, and 102F, as well as the nodes 302, are particularly called out in FIG. 5.

In the recursive hierarchical differential approach in the example of FIG. 5, the value of the node 102A is actually stored in the compressed representation of the two-dimensional plane 150 of the CLUT 100. By comparison, the difference values of all the other nodes of the two-dimensional plane 150 are stored in the compressed representation of the plane 150 of the CLUT 100. This distinction is indicated in FIG. 5 by the node 102A being solid, and all the other nodes being hollow.

The recursive hierarchical differential approach can be performed over the lines 152 on a line-by-line basis as follows in relation to the example of FIG. 3. For the nodes of the first line ending at the node 102D, the difference values for the nodes are determined (and stored) as has been described in the preceding section of the detailed description in relation to the non-recursive hierarchical differential approach. For example, the predicted value of the node 302B is determined based on the actual value of the node 302A (such as by being equal to the value of the node 302A), and the difference value for the node 302B is determined and stored.

In the second line, the difference value of the node 302C is also determined in the recursive hierarchical differential approach no differently than in the non-recursive hierarchical differential approach in one embodiment. For instance, the predicted value of the node 302C is determined based on the actual value of the node 102A, and the difference value for the node 302C is determined and stored. However, each other node of the second line has its difference value determined recursively.

For example, in relation to the node 302D, a first predicted value of the node 302D may be determined based on the actual value of the immediately adjacent node 302A, located upwards of the node 302D, and a first difference value of the node 302D is determined as the actual value of the node 302D minus this first predicted value. A second predicted value of the node 302D may be determined based on the actual value of the immediately adjacent node 302C, located to the left of the node 302D, and a second difference value of the node 302D is determined as the actual value of the node 302D minus this second predicted value. An ultimate, or third, difference value of the node 302D is then determined as the first difference value minus the second difference value. This ultimate difference value is that which is stored for the node 302D within the compressed representation of the CLUT 100.

This process continues for each of the remaining nodes within the second line. For each of the remaining lines of the plane 150, the nodes of each such line are processed similarly to how the nodes of the second line are processed. That is, the first node of each line has its difference value determined non-recursively in relation to a predicted value based on the actual value of the immediately adjacent node of the above line. The second through last nodes of each line each has its stored difference value determined recursively, as has been described in exemplarily relation to the node 302D in the previous paragraph. In this way, the recursive hierarchical differential approach is used to compress the CLUT 100 in a lossless manner.

As in the non-recursive hierarchical differential approach described in the preceding section of the detailed description, the origin node 102A of the plane 150, corresponding to the tuple (0,0,0), has its value stored without compression, and all the other nodes of the plane 150 are stored in a compressed manner, by storing their difference values in lieu of their (actual) values. Planes successive to the plane 150 have origin nodes corresponding to tuples (1,0,0), (2,0,0), . . . , (Y,0,0). In one embodiment, the origin node of each of these successive planes may also have its value stored without compression, and all the other nodes of the plane in question stored in a compressed manner. In another embodiment, however, the origin node of each plane successive to the plane 150 is stored in a compressed manner, such that for the entire CLUT 100, just the node 102A has its value stored without compression, as has been described in the previous section of the detailed description.

Furthermore, as in the non-recursive hierarchical differential approach described in the preceding section of the detailed description, the predicted node value of a given node can be equal to the value of a preceding node that has already been processed in one embodiment. For example, the first predicted value of the node 302D may simply be equal to the actual value of the node 302A, and the second predicted value of the node 302D may simply be equal to the actual value of the node 302C. As has been noted above, such a simple embodiment nevertheless achieves good compression results, due to the characteristic of a typical CLUT that the values of immediately adjacent nodes are highly correlated.

The CLUT compression approach that has been exemplarily described in relation to FIG. 5 is a hierarchical approach in that it leverages the hierarchical nature of CLUT's, as has been described in the preceding section of the detailed description. Likewise, the CLUT compression approach is a differential encoding approach as has been described in the preceding section of the detailed description. However, unlike the CLUT compression approach described in the preceding section of the detailed description, the CLUT compression approach described in relation to FIG. 5 is a recursive, and not a non-recursive approach.

This is because the large majority of nodes have stored difference values that are determined recursively. This is unlike the non-recursive hierarchical differential encoding approach, in which a difference value is determined as the difference between the actual value of a node and the predicted value of the node. Rather, in the recursive hierarchical differential encoding approach, the majority of the difference values that are stored are determined as differences of two (potentially non-recursively determined) difference values.

For example, as to the node 302D, the first difference value is non-recursive, and is the difference between the actual value of the node 302D and the predicted value of the node 302D that is determined based on the actual value of the node 302A. The second difference value of the node 302D is also non-recursive, and is the difference between the actual value of the node 302D and the predicted value of the node 302D that is determined based on the actual value of the node 302C. The ultimate, or third, difference value of the node 302D that is actually stored is by comparison recursive in this example, because it is the difference of the first and the second difference values. Thus, in the recursive hierarchical differential encoding approach, "differences of differences" are determined, unlike in the non-recursive hierarchical differential encoding approach.

The recursive hierarchical differential encoding approach is generally advantageous to the non-recursive hierarchical differential encoding approach in that the recursive difference values that are ultimately stored are typically even smaller than the non-recursive difference values that are stored in the non-recursive hierarchical differential encoding approach. Therefore, the recursive hierarchical differential encoding approach may able to provide better compression than the non-recursive hierarchical differential encoding approach can. However, more computations have to be performed in the recursive hierarchical differential encoding approach than in the non-recursive hierarchical differential encoding approach.

Figure 6:
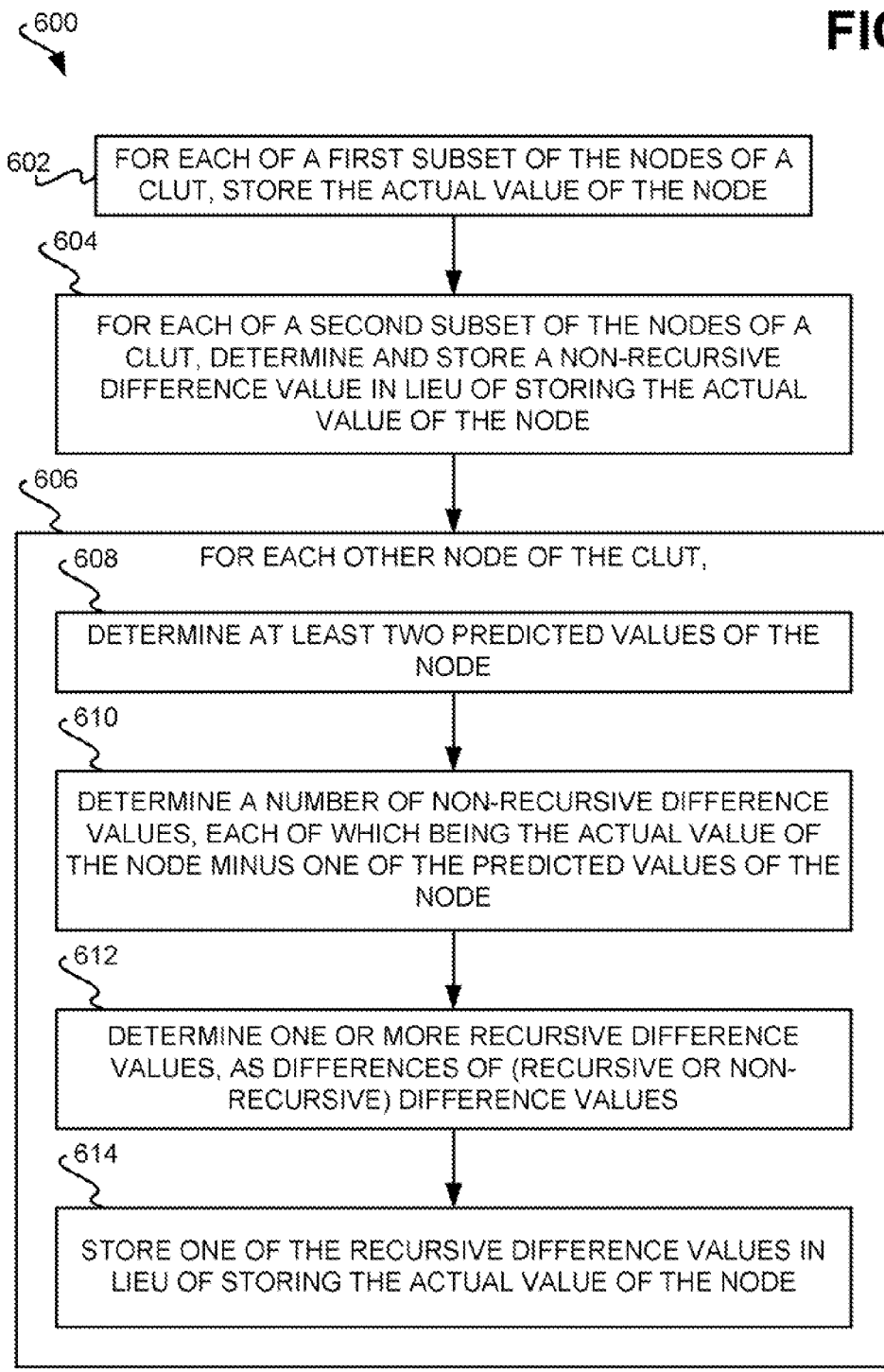
FIG. 6 is a flowchart of a method for compressing a CLUT in accordance with a recursive hierarchical differential encoding approach, according to an embodiment of the present disclosure.

FIG. 6 shows a method 600 that summarizes the recursive differential encoding approach for compressing the CLUT in a lossless manner and that has been exemplarily described in relation to FIG. 5, according to an embodiment of the present disclosure. For each node of a first subset of the nodes of the CLUT, the actual value of the node is stored on a computer-readable medium as part of the compressed representation of the CLUT (602). This subset of the nodes includes at least one node of the CLUT, such as the origin node of the first plane of the CLUT that is processed. This subset may also include at least one node of each other plane of the CLUT.

Next, for each node of a second subset of the nodes of the CLUT, a non-recursive difference value is determined and stored on the computer-readable medium as part of the compressed representation of the CLUT, in lieu of storing the actual value of the node (604). This second subset of nodes can include, for instance, the nodes of the first line of each plane, as well as the first nodes of all the other lines of each plane, as has been described. Determining a non-recursive difference value for each such node can be achieved as has been described in part 404 of the method 400 of FIG. 4 in one embodiment.

Thereafter, the following is performed for each other node of the CLUT (606)—that is, for each node of each plane that is not on the first line of a plane and that is not the first node of any other line of the plane. At least two predicted values of the node are determined (608). For example, a first predicted value may be determined in relation to one immediately adjacent node that has been processed, and a second predicted value may be determined in relation to another immediately adjacent node that has been processed.

A corresponding number of non-recursive difference values is then determined (610). Each non-recursive difference value may be equal to the actual value of the node minus one of the predicted values of the node. For example, a first non-recursive difference value may be determined in relation to the first predicted value, and a second non-recursive difference value may be determined in relation to the second predicted value.

Thereafter, one or more recursive difference values are determined for the node (612), as differences of recursive and/or non-recursive difference values. In the example that has been described in relation to FIG. 5, for instance, one recursive difference value is determined, as the difference of two non-recursive difference values. One of the recursive difference values determined for the node is then stored on the computer-readable medium as part of the compressed representation of the CLUT (614), in lieu of storing the actual value of the node.

Serializing CLUT Values for Hierarchical Differential Encoding

The general difference value approach to compressing and decompressing CLUT's that was illustrated in FIGS. 2A and 2B respectively, offers considerable freedom in the order of computing and storing difference values, provided that the order meets the requirement that all values required by the predictor 204' in FIG. 2B for making a given prediction are available before the prediction. This freedom in selecting the order may be utilized in order to improve compression performance when serializing the data from its inherent multi-dimensional CLUT representation to a sequential representation for communication from one device to another or for storage in a memory device.

The order of serialization also determines which values need to be retained in memory at any given time in order to allow the compression and decompression to function. For example, in the non-recursive hierarchical differential encoding approach described in relation to FIG. 3, it is known that for each line of a given plane of a CLUT, the node value of the first node has to be retained until the first node of the next line has been processed, since the first node of the next line has its predicted value determined based on the value of the first node of the current line. Likewise, the node value of a current node of the line has to be retained until the next node within the same line has been processed, since the next node has its predicted value determined based on the value of the current node. Where the origin nodes of planes other than the first plane are also compressed, the origin node of a current plane also has to be retained until the origin node of the next plane has been processed.

As another example, in the recursive hierarchical differential encoding approach described in relation to FIG. 5, it is known that for each line of a given plane of a CLUT, the node value of the each node has to be retained until the corresponding node in the next line has been processed. This is because the corresponding node in the next line has one of its predicted values determined based on the value of its counterpart node in the current line. Where the origin nodes of planes other than the first plane are also compressed, the origin node of a current plane also has to be retained until the origin node of the next plane has been processed.

Figure 7A:
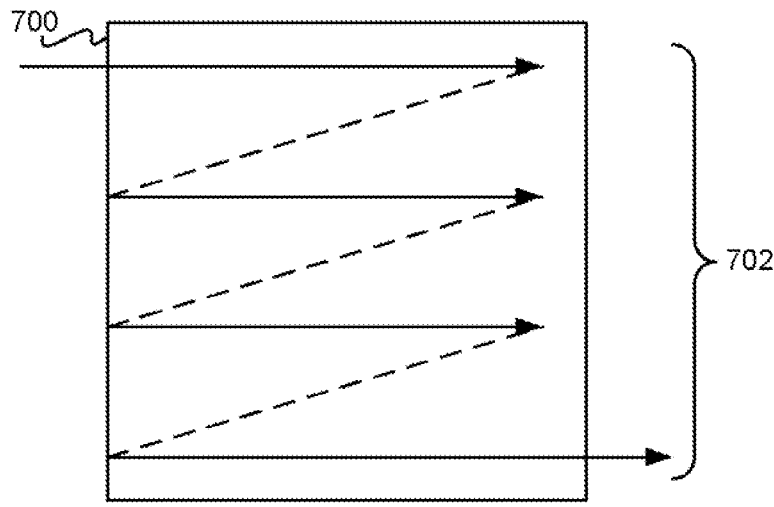
FIGS. 7A, 7B and 7C are diagrams depicting different approaches by which the nodes of a representative plane of a CLUT can be processed in a serialized node-by-node manner, according to different embodiments of the present disclosure.
Figure 7B:
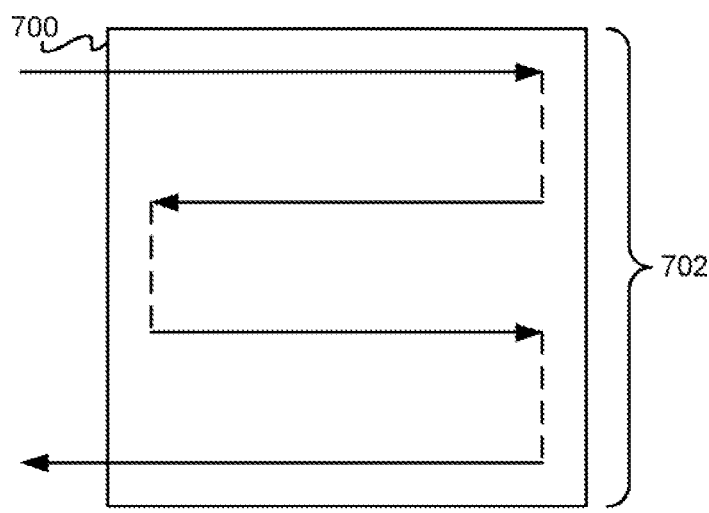
Figure 7C:
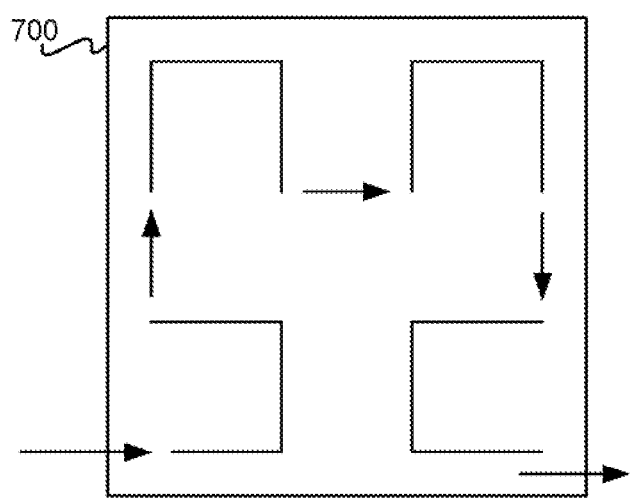

FIGS. 7A, 7B, and 7C show different approaches by which the nodes of a given plane 700 of a CLUT can be processed to serialize the nodes of the CLUT for reception by the device (or for reception by the component within the device) that is perform non-recursive or recursive hierarchical differential encoding, according to different embodiments of the present disclosure. The CLUT of which the representative plane 700 is a part has a number of such planes over which the nodes of the CLUT are organized. These two-dimensional planes are processed sequentially on a plane-by-plane basis. Furthermore in FIGS. 7A and 7B specifically, the representative plane 700 that is depicted has a number of nodes (not shown) that are organized over a number of lines 702.

In FIG. 7A, a raster approach is depicted by which the nodes of the representative plane 700 can be received in a serialized node-by-node manner. Within the representative plane 700, each of the lines 702 is processed sequentially, from the top line to the bottom line. Within each of these lines 702, the nodes within the line in question are processed from a first node to a last node. As specifically depicted in FIG. 7A, for instance, the nodes in each line are processed from left to right.

In FIG. 7B, a c-scan approach is depicted by which the nodes of the representative plane 700 can be received in a serialized node-by-node manner. Within the plane 700, each of the lines 702 is again processed sequentially, from the top line to the bottom line. The nodes within the first line are processed from a first node to a last node (e.g., from left to right), the nodes within the second line are processed from a last node to a first node (e.g., from right to left), and this alternating approach of starting from a first node at a given line where the previous line was started from a last node, and vice-versa, is repeated until all the lines 702 have been processed. It thus can be said that for each successive pairs of lines, the first line of each pair is processed from its first node to its last node, and the second line of each pair is processed from its last node to its first node.

Finally, in FIG. 7C, what can be described as a Hilbert approach is depicted by which the nodes of the representative plane 700 can be received in a serialized node-by-node manner. Within the plane 700, the nodes are processed in accordance with what is known within the art as a Hilbert curve. That is, the nodes in the lower-left quadrant of the plane 700 are initially processed by following a reverse-C curve, then the nodes in the upper-left quadrant are processed by following an upside-down U curve, then the nodes in the upper-right quadrant are processed also by following an upside-down U curve, and finally the nodes in the lower-right quadrant are processed by following a C curve.

Cellular Interpolative Prediction Approach

Figure 8A:
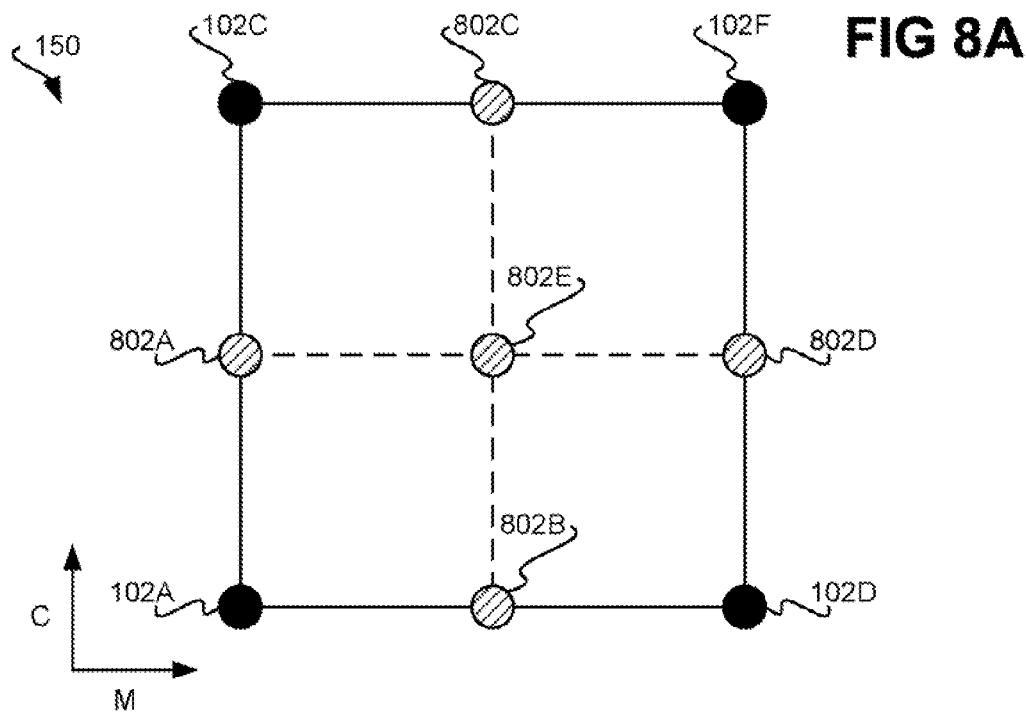
FIGS. 8A and 8B are diagrams of a plane of a representative CLUT, in relation to which a cellular interpolation prediction approach for compressing the CLUT is illustrated, according to an embodiment of the present disclosure.
Figure 8B:
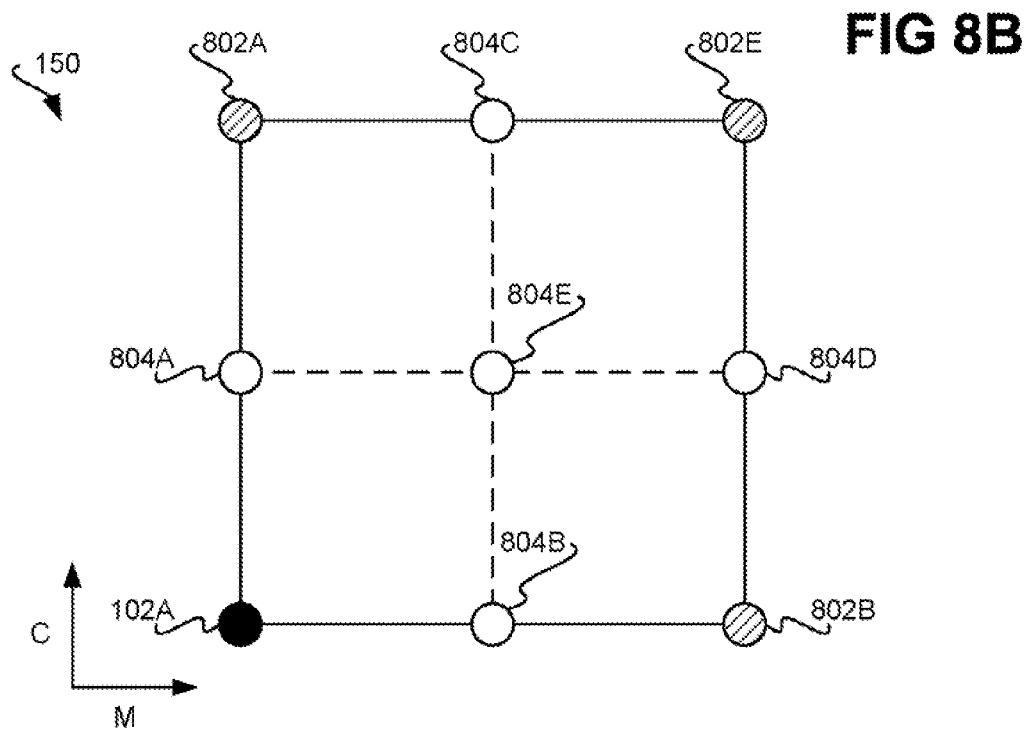

FIGS. 8A and 8B illustrate a cellular interpolative prediction approach for compressing the nodes of a color lookup table (CLUT), in relation to an exemplarily two-dimensional CLUT 150. Note that for the description of the cellular interpolative approach, the CLUT 150 is understood to be a two-dimensional CLUT having two axes corresponding to C and M. This is in contrast with the description of the preceding embodiments where Plane 150 represented one plane of a three dimensional CLUT. It is noted that the x-axis corresponding to magenta has been modified to point to the right in FIGS. 8A and 8B as opposed to pointing to the left in FIG. 1B, for illustrative and descriptive convenience, while the y-axis corresponding to cyan remains pointed upwards in FIGS. 8A and 8B, as it is in FIG. 1B. Besides the nodes 102A, 102C, 102D, and 102F being called out, additional nodes 802A, 802B, 802C, 802D, and 802E, collectively referred to as the nodes 802, are also called out in FIG. 8A. Likewise, besides the nodes 102A, 802A, 802B, and 80E being called out, additional nodes 804A, 804B, 804C, 804D, and 804E, collectively referred to as the nodes 804, are also called out in FIG. 8B.

The cellular interpolative prediction approach is exemplarily described initially in relation to FIG. 8A. FIG. 8A shows the corner nodes 102A, 102C, 102D, and 102F that enclose the complete planar region corresponding to the CLUT 150. The actual values of the corner nodes 102A, 102C, 102D, and 102F are stored in the compressed representation of the CLUT 150, the fact of which is indicated by these nodes being solid in FIG. 8A. Thereafter, the plane 150 is divided into sections, such as equally sized sections. In the example of FIG. 8A, the CLUT 150 has been divided into four equally sized quadrants. The corner nodes of these quadrants include the nodes 102A, 102C, 102D, and 102F, as well as the nodes 802.

A difference value for each of the nodes 802 is determined and stored in the compressed representation of the CLUT 150, in lieu of the actual value for each of the nodes 802 being stored, the fact of which is indicated by the nodes 802 being shaded in FIG. 8A. The difference value for each of the nodes 802 is determined as follows. First, an interpolated value for such a node is determined, and the interpolated value is subtracted from actual value for the node to determine the difference value for the node.

The interpolated value for a node in this cellular interpolative prediction approach is akin to the predicted value for a node in the hierarchical differential encoding approaches. Like the predicted value for a node, the interpolated value for a node is subtracted from the actual value for a node to determine the difference value of the node. However, the interpolated value is determined by interpolating the actual values of two or more other nodes, while the predicted value is typically determined based on the actual value of one other node. Furthermore, the interpolated value is determined by interpolating the actual values of two or more other nodes that are not necessarily adjacent to the node in question, while the predicted value is typically determined based on the actual value of an immediately adjacent node.

For example, first the interpolated values for the nodes 802A, 802B, 802C, and 802D are determined. The interpolated value for the node 802A is determined based on the values of the nodes 102A and 102C located on the same edge of the CLUT 150 on which the node 802A is located. Likewise, the interpolated value for the node 802B is determined based on the values of the nodes 102A and 102D located on the same edge on which the node 802B is located. Similarly, the interpolated value for the node 802C is determined based on the values of the nodes 102C and 102F located on the same edge on which the node 802C is located, and the interpolated value for the node 802D is determined based on the values of the nodes 102D and 102F located on the same edge on which the node 802D is located.

In one embodiment, the interpolated value for a given node is determined by averaging the actual values of the nodes located on the same edge of the CLUT 150 on which the given node is located. Thus the interpolated value for the node 802A is the average of the values of the nodes 102A and 102C, and the interpolated value for the node 802B is the average of the values of the nodes 102A and 102D. Likewise, the interpolated value for the node 802C is the average of the values of the nodes 102C and 102F, and the interpolated value for the node 802D is the average of the values of the nodes 102D and 102F.

Once the interpolated values for the nodes 802A, 802B, 802C, and 802D have been determined, and the difference values for these nodes determined and stored, the interpolated value for the node 802E that is not located along any of the edges of the CLUT 150 is determined. The interpolated value for the node 802E can be determined in any of a number of different ways. The interpolated value for the node 802E can be based on the actual values of the nodes 102A, 102C, 102D, and 102F, or based on the actual or interpolated values of the nodes 802A, 802B, 802C, and/or 802D. Once the interpolated value for the node 802E has been determined, the difference value for the node 802E is determined and stored.

Prior to the division of the CLUT 150 into four equally sized sections or quadrants, the four nodes 102A, 102C, 102D, and 102F comprising of the nodes that are widest apart along each of the axes, correspond to what is referred to as a first and coarsest level of the CLUT 150. That is, the distance between any two of the corner nodes 102A, 102C, 102D, and 102F parallel to the same (cyan or magenta) axis is greater than the distance between any other two of the nodes of the plane 150 parallel to the same (cyan or magenta) axis. Therefore, the difference values determined and stored for the nodes 802 in FIG. 8A are likely to be, statistically, the largest magnitude difference values determined in the cellular interpolative prediction approach, where adjacent nodes within the CLUT 150 are highly correlated with one another.

Next, each of the sections into which the CLUT 150 has been divided is likewise divided into sections, and the process described in relation to FIG. 8A is repeated at each of these new sections at what is referred to as the next coarsest (i.e., finer) level. FIG. 8B exemplarily shows the lower-left portion or quadrant of the sections into which the CLUT 150 has been divided in FIG. 8A. Those, the section depicted in FIG. 8B has corner nodes 102A, 802A, 802B, and 802E.

The actual value of the corner node 102A has already been stored within the compressed representation of the CLUT 150, while the difference values of the nodes 802A, 802B, and 802E have already been stored within the compressed representation of the CLUT 150. The section depicted in FIG. 8B is again divided into sections, such as equally sized sections. In the example of FIG. 8B, the section has been divided into four equally sized quadrants. The corner nodes of these quadrants include the nodes 102A, 802A, 802B, and 802E, as well as the nodes 804.

A difference value for each of the nodes 804 is determined and stored in the compressed representation of the CLUT 150, in lieu of the actual value for each of the nodes 804 being stored, the fact of which is indicated by the nodes 804 being hollow in FIG. 8B. The difference value for each of the nodes 804 is determined in a manner similar to that in which the difference values for the nodes 802 were determined in FIG. 8A. First, an interpolated value for such a node is determined, and the interpolated value is subtracted from the actual value of the node to determine the difference value of the node.

More specifically, first the interpolated values for the nodes 804A, 804B, 804C, and 804D are determined. The interpolated value for the node 804A is determined based on the values of the nodes 102A and 802A located on the same outside edge on which the node 804A is located. Likewise, the interpolated value for the node 804B is determined based on the values of the nodes 102A and 802B located on the same outside edge on which the node 804B is located. Similarly, the interpolated value for the node 804C is determined based on the values of the nodes 802A and 802E located on the same outside edge on which the node 804C is located, and the interpolated value for the node 804D is determined based on the values of the nodes 802B and 802E located on the same outside edge on which the node 804D is located.

Once the interpolated values for the nodes 804A, 804B, 804C, and 804D have been determined, and the difference values for these nodes determined and stored, the interpolated value for the node 804E that is not located along any of the outside edges is determined. As was the case for the interpolated value for the node 802E in FIG. 8A, the interpolated value for the node 804E in FIG. 8B can be determined in any of a number of different ways. The interpolated value for the node 804E can be based on the actual value of the node 102A and the actual or interpolated values of one or more of the nodes 802A, 802B, and 802E, or based on the actual or interpolated values of the nodes 804A, 804B, 804C, and/or 804D. Once the interpolated value for the node 804E has been determined, the difference value for the node 804E is determined and stored.

It is noted that the distance between the corner nodes of the section of the CLUT 150 depicted in FIG. 8B parallel to the same (cyan or magenta) axis is smaller than the distance between the corner nodes of the CLUT 150 depicted in FIG. 8A parallel to the same (cyan or magenta) axis. Therefore, the difference values determined and stored for the nodes 804 in FIG. 8B are likely to be, statistically, on average, smaller in magnitude than the difference values determined and stored for the nodes 802 where adjacent nodes within the CLUT 150 are highly correlated with one another. Because there are four sections in FIG. 8A, and each of these sections is itself divided into four sections as exemplarily depicted in FIG. 8B, this means that there are roughly four times as many difference values determined for these smaller sections than for the larger sections.

This is advantageous, since as each section is divided into still smaller sections with each procession in granularity level (i.e., from coarsest to finest), although the number of difference values that are determined and stored increases, the sizes of these difference values decreases where adjacent nodes within the CLUT 150 are highly correlated with one another. Thus, within the cellular interpolative prediction approach to CLUT compression, the number of nodes having larger difference values is likely to be greatly outnumbered by the number of nodes having smaller difference values. Therefore, relatively efficient CLUT compression is achieved, because there is likely to be more small difference values stored than large difference values.

The upper-left, lower-right, and upper-right quadrants into which the CLUT 150 has been divided in FIG. 8A are processed in the same manner that has been exemplarily described in relation to the lover-left quadrant in FIG. 8B. It is noted that the end result of this processing at this next coarsest (i.e., finer) level of granularity is that there are sixteen sections, because each of the four initial quadrants of FIG. 8A has itself been divided into four sections. Therefore, the cellular interpolative prediction approach advances to the still next coarsest (i.e., even finer) level, in which each of these sixteen new sections is itself divided into a number of sections, such as equally sized sections like four equally sized quadrants, and processed in the same manner that has been described in relation to FIG. 8B.

This iterative process continues until the sections into which a given section has been divided cannot themselves be divided further. That is, at some point, the sections into which a given section has been divided have as their corner nodes immediately adjacent nodes within the CLUT 150. At this point, these sections cannot be divided further, since there are no nodes between immediately adjacent nodes within the CLUT 150.

The cellular interpolative process as a whole, therefore, starts with a coarsest granular representation of, or level within, a given geometry of the CLUT 150, and iteratively proceeds on a level-by-level basis, dividing the geometry into sub-geometries, and the sub-geometries into sub-sub-geometries, and so on, until the finest granular representation of, or level within, the given geometry of the CLUT 150 has been processed. The finest granular representation of or level within the CLUT 150 is one in which the corner nodes in question are immediately adjacent nodes within the CLUT 150. As such, no further (or finer) division can be achieved.

In the example that has been described in relation to FIGS. 8A and 8B, the geometry of the CLUT 150 is a two-dimensional square planar region, such that the cellular interpolative process is performed on a quadrant-by-quadrant basis until all the planes of the CLUT 150 have been processed. Thus, the CLUT 150 of FIG. 8A is divided into four sections, or sub-quadrants, such as that depicted in FIG. 8B, and these four sections or sub-quadrants are each divided into four additional sections or sub-quadrants. This process is iteratively repeated until the sections or sub-quadrants in question have corner nodes that are immediately adjacent nodes within the CLUT 150, and cannot be further divided into finer sections or sub-quadrants.

It is noted, however, that this geometry by which the CLUT 150 is iteratively processed on a level-by-level basis may not be a plane. For example, the geometry may be a three-dimensional volume, which is particularly apt in the case where the CLUT in question is three-dimensional. In such instance, each three-dimensional volume is divided into a number of sections, or sub-volumes, and these sections or sub-volumes are each divided into additional sections or sub-volumes, and so on, until the sections or sub-volumes in question have corner nodes that are immediately adjacent nodes within the CLUT. As another example, the geometry may be a one-dimensional line, which is particularly apt in the case where the CLUT in question is one-dimensional.

In the example that has been described in relation to FIGS. 8A and 8B, for the first level, the actual values for corner nodes 102A, 102C, 102D, and 102F are stored within the compressed representation of the CLUT 150, while the difference values are stored within the compressed representation for all the other nodes. Alternatively, the corner nodes for the next plane may themselves be compressed by determining and storing difference values based on predicted values determined in relation to the corner nodes of the current plane.

The CLUT compression approach that has been exemplarily described in relation to FIGS. 8A and 8B is an interpolative approach in that the difference values for the vast majority of the nodes of a CLUT are generated based on interpolated values. The interpolated value of a node is interpolated based on the actual values of two or more other nodes at an immediately higher (i.e., coarser) level of granularity. Thus, the nodes 802 have their interpolated values determined by interpolating the actual values of two or more of the nodes 102A, 102C, 102D, and 102F that are located at an immediately higher (i.e., coarser) level of granularity. The nodes 102A, 102C, 102D, and 102F are the corner nodes of a section—the CLUT 150—into which the sections having the nodes 802 as corner nodes has been divided. Thus, the nodes 802 represent an immediately lower (i.e., finer) level of granularity than the nodes 102A, 102C, 102D, and 102F represent.

The CLUT compression approach that has been exemplarily described in relation to FIGS. 8A and 8B is a cellular approach in that a CLUT is divided into successively finer and higher resolution cells. The sections, portions, and quadrants that have been described in this section of the detailed description correspond to such cells, for instance. This compression approach can also be considered an iterative approach, in that a cell is divided into a number of additional cells at the next level of granularity, which are themselves each divided into a number of additional cells at the still next level of granularity, and so on, as has been described.

FIG. 9 shows a method 900 that summarizes the cellular interpolative prediction approach for compressing a CLUT in a lossless manner and that has been exemplarily describe din relation to FIGS. 8A and 8B, according to an embodiment of the present disclosure. For each node of a first subset of the nodes of the CLUT, the actual value of the node is stored on a computer-readable medium as part of the compressed representation of the CLUT (902). This subset of the nodes includes at least the corner nodes at the coarsest level of representation of the CLUT, of one of the first plane, volume, or line of the CLUT that is iteratively processed. This subset may also include the corner nodes at the coarsest level of representation of the CLUT, of each other plane, volume, or line of the CLUT that is iteratively processed.

Thereafter, the following is performed for every other node of the CLUT (904). First, an interpolated value of the node is determined (906). As has been described, the interpolated value of the node is determined by interpolating the values of two or more nodes that represent a level of granularity that is immediately coarser than the level of granularity at which the node in question is located. That is, the interpolated value of the node is determined by interpolating the values of two or more nodes that represent a level of granularity that is immediately coarser than the level of granularity that the node in question partially represents (and completely represents along with one or more other nodes). For example, the nodes 102A, 1020, 102D, and 102F are at a level of granularity in FIG. 8A that is immediately coarser than the level of granularity at which the nodes 802 are located, and the nodes 102A, 802A, 802B, and 802E are at a level of granularity in FIG. 8B that is immediately coarser than the level of granularity at which the nodes 804 are located.

Thereafter a difference value of the node is determined (908). The difference value is determined as the actual value of the node minus the interpolated value of the node. This difference value is then stored on the computer-readable medium as part of the compressed representation of the CLUT (910), in lieu of storing the actual value of the node.

Serializing CLUT Values for Cellular Interpolative Prediction

As has been described above in relation to the hierarchical differential encoding approaches as well, the uncompressed actual values of the nodes of the CLUT may have to be serialized for storage on a computer-readable medium or for transmission over a communication link in a particular node-by-node manner that is known a priori to both the transmitting device and the receiving device. Likewise, the receiving device has to known a priori, in accordance with its particular cellular interpolative scheme, which uncompressed nodes have to be maintained even after compression, and which uncompressed nodes can be discarded after compression. Serialization of the nodes of the CLUT on a node-by-node basis thus again refers to how the nodes of the CLUT are reordered for storage or transmission to the device, or to the component thereof, that is to perform the compression, so that at any level, the CLUT node values corresponding to a coarser level, which are necessary in order to predict the values at the current level, are available at the decompressor.

For example, in the cellular interpolative prediction approach described in relation to FIGS. 8A and 8B, it is known that at each level of granularity for a given plane of a CLUT, the node values of the nodes at this level of granularity have to be available in order to restore the nodes at the next level of granularity. This is because the nodes at the next level of granularity have their interpolated values determined based on the actual values of nodes at the present level of granularity.

For instance, the interpolated values for the nodes 802 in FIG. 8A are determined based on the actual values for the nodes 102A, 102C, 102D, and 102F at the immediately preceding (i.e., coarser) level of granularity. Similarly, the interpolated values for the nodes 804 in FIG. 8B are determined based on the actual values for the nodes 102A, 802A, 802B, and 802E at the immediately preceding (i.e., coarser) level of granularity. It is noted in the example of FIG. 8B that the node 102A is actually present at two levels of granularity: the coarsest level of granularity denoted by the CLUT 150 as a whole, and at the next coarsest (i.e., finer) level of granularity denoted by the sections into which the CLUT 150 has been divided in FIG. 8A. This is because the node 102A is a corner node to both the CLUT 150, and the to the lower-left sub-plane of the four sub-planes into which the CLUT 150 has been divided. (The same is true for the nodes 102C, 102D, and 102F as to the upper-left sub-plane, the lower-right sub-plane, and the upper-right sub-plane, respectively, in FIG. 8A.)

Figure 10A:
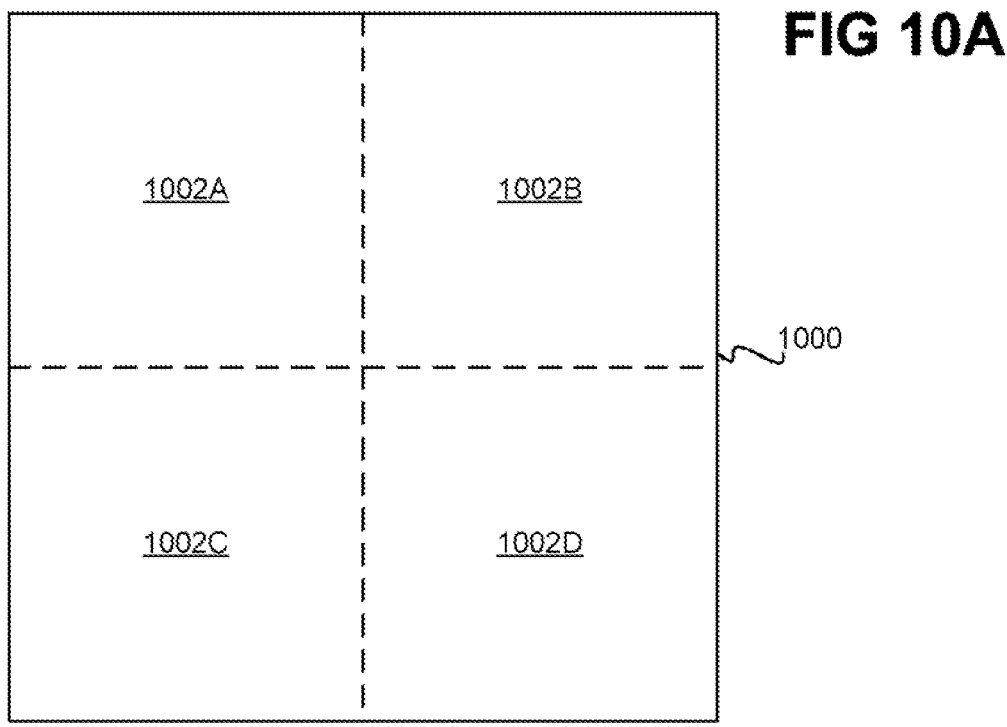
FIGS. 10A, 10B and 10C are diagrams depicting an approach by which the nodes of a representative plane of a CLUT can be processed in a serialized node-by-node manner, according to another embodiment of the present disclosure.
Figure 10B:
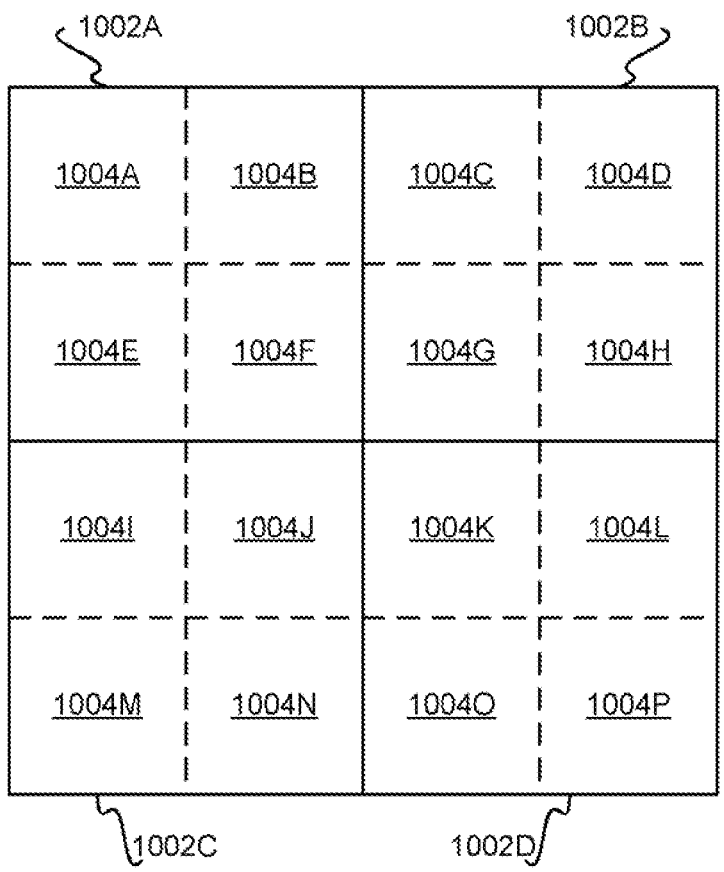
Figure 10C:
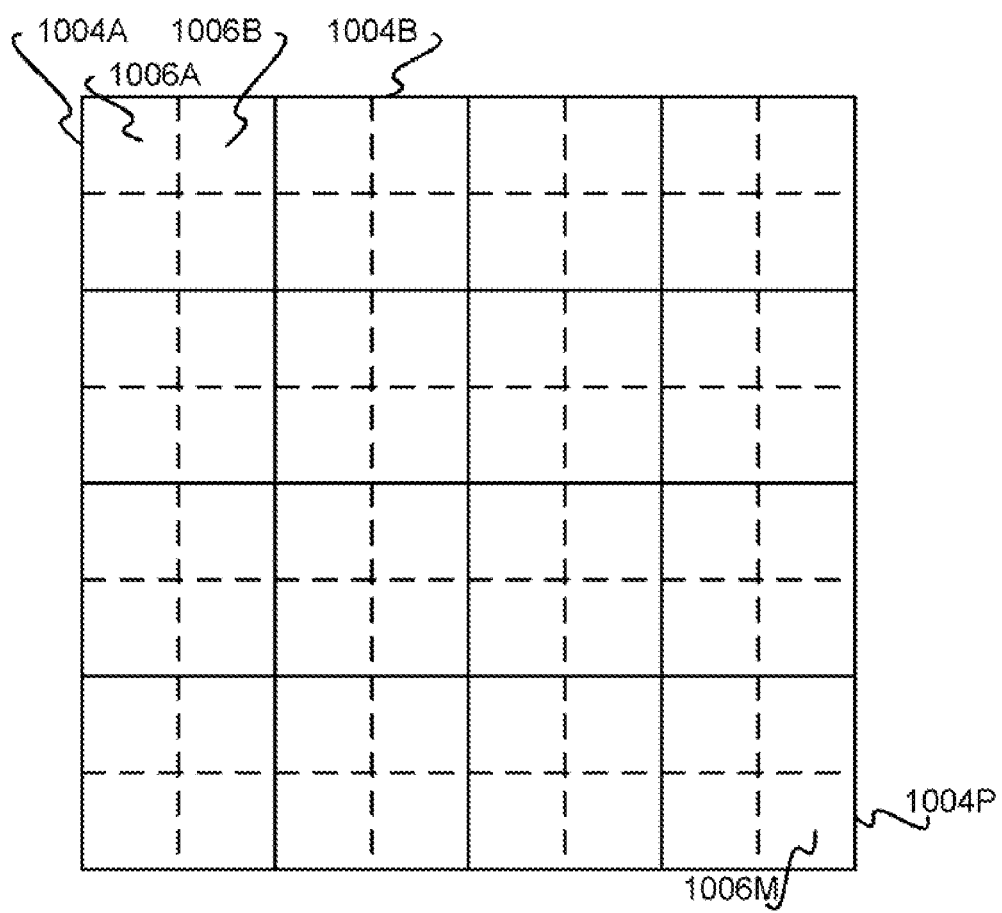

FIGS. 10A, 10B, and 10C show an approach by which the nodes of a two-dimensional CLUT 1000 can be processed to serialize the nodes of the CLUT to perform cellular interpolative prediction, according to an embodiment of the present disclosure. The nodes of the plane 1000 are not depicted in FIGS. 10A, 10B, and 10C for illustrative convenience and clarity.

In FIG. 10A, the coarsest level of representation of the CLUT 1000 of the CLUT is the extreme corner nodes of the CLUT 1000 itself. Therefore, the corner nodes of the plane 1000 may be serially transmitted in a predetermined order, such as proceeding from the lower-left corner node and advancing among the corner nodes in a clockwise direction. The next coarsest (i.e., finer) level of representation of the CLUT 1000 is division of the planar region enclosed by the CLUT 1000 into four sections 1002A, 1002B, 1002C, and 1002D, collectively referred to as the sections 1002. The difference values obtained from the aforementioned prediction process for the corner nodes in each of these four sections 1002, may also be serially transmitted in a predetermined order, omitting any node that has been already been transmitted as part of the previous level of granularity (i.e., the coarsest level). There are five such nodes, which may be transmitted by proceeding, in a clockwise manner, from the left node to the top node to the right node to the bottom node and finally to the center node.

The foregoing can be understood in better detail in relation to the previously described FIG. 8A. In FIG. 8A, at the coarsest level of representation of the CLUT 150, the nodes 102A, 102C, 102F, and 102D are transmitted in this order. At the next coarsest (i.e., finer) level of representation, achieved by dividing the CLUT 150 into four sections, the nodes 802A, 802C, 8029, 802B, and 802E are transmitted in this order. It is noted that the nodes 102A, 102C, 102F, and 102D, while a part of this finer level of representation due to their being corner nodes of the four sections into which the CLUT 150 has been divided, are not transmitted. This is because these nodes are also a part of an immediately preceding (i.e., coarser) level of representation that has already been transmitted.

Referring next to FIG. 10B, the four sections 1004 have themselves each been divided into four sections, resulting in sixteen sections 1004A, 1004B, 1004C, 1004D, 1004E, 1004F, 1004G, 1004H, 1004I, 1004J, 1004K, 1004L, 1004M, 1004N, 1004O, and 1004P, collectively referred to as the sections 1004. The five corner nodes of each grouping of four of these sections 1004 encompassed by one of the sections 1002 may be serially transmitted in the same predetermined order in which the five corner nodes of the sections 1002 were previously transmitted. That is, for each grouping of four of these sections 1004, transmission may start at the bottom left corner node and proceed in a clockwise manner, ultimately ending at the center node, and again omitting any node that has already been transmitted as part of any previous level of granularity.

Furthermore, the nodes of the four sections 1004 encompassed by the lower-left section 1002C may be transmitted first, and the nodes of the four sections 1004 encompassed by the upper-left section 1002A may be transmitted second. Thereafter, the nodes of the four sections 1004 encompassed by the upper-right section 1002B may be transmitted third, and the nodes of the four sections 1004 encompassed by the lower-right section 1002D may be transmitted last. Thus, groupings of four of these sections 1004 corresponding to the sections 1002 are themselves processed on a grouping-by-grouping basis, in a clockwise direction, starting from the lower-left grouping.

Referring finally to FIG. 10C, the sixteen sections 1004 have themselves each been divided into four sections, resulting in 64 sections 1006A, 1006B, . . . , 1006M, collectively referred to as the sections 1006. The five corner nodes of each grouping of four of these sections encompassed by one of the sections 1004 may be serially transmitted in the same predetermined order in which the five corner nodes of the sections 1002 were previously transmitted. Furthermore, groupings of four of these sections 1006 corresponding to the sections 1004 are themselves processed on a grouping-by-grouping basis, starting from the exterior lower-left grouping corresponding to the section 1004M in FIG. 10B and proceeding through the twelve groupings corresponding to the sections 1004M, 1004I, 1004E, 1004A, 1004B, 1004C, 1004D, 1004H, 1004L, 1004P, 1004O, and 1004N in FIG. 10B along the exterior of the plane 1000. Thereafter, the ordering restarts at the interior lower-left grouping corresponding to the section 1004J in FIG. 10B and proceeding through the four groupings corresponding to the sections 1004J, 1004F, 1004G, and 1004K within the interior of the plane 1000.

Thus, the node-by-node serialization approach exemplarily described in relation to FIGS. 10A, 10B, and 10C proceeds on a geometry-by-geometry basis, such as on a plane-by-plane basis or a volume-by-volume basis, within the CLUT in question. Within each such geometry (i.e., within each such plane or volume), the nodes are serialized on a level-by-level basis over a number of levels from a coarsest level representing the greatest distance among nodes and a finest level representing the least distance among nodes. The coarsest level represents one of the geometries (i.e., one of the planes or one of the volumes) as a whole. Each next coarsest (i.e., finer) level represents a number of sub-geometries (i.e., sub-planes or sub-volumes) within this geometry. The finest level represents the sub-geometry having corner nodes that are immediately adjacent nodes within the CLUT.

General Method and System

FIG. 11 shows a method 1100 for compressing a color lookup table (CLUT) in a lossless manner by using any of the approaches that have been described in the preceding sections of the detailed description, according to an embodiment of the present disclosure. The nodes of the CLUT are received in a serialized node-by-node manner (1102). For instance, this can be the serialized node-by-node manner described in relation to FIG. 7A, 7B, or 7B, or the serialized node-by-node manner described in relation to FIGS. 10A, 10B, and 10G.

For each node that is received, in the order in which the nodes of the CLUT are received (1104), either part 1106 is performed or parts 1108 and 1110 are performed. First, the actual value of the node may be stored in the compressed representation of the CLUT on a computer-readable medium (1106). In general, if the value of the node cannot be compressed to yield a difference value on the basis of the actual values of one or more previously received nodes, then the value of the actual value of the node is stored in uncompressed form in part 1106.

Second, the difference value of the node may be determined (1108), which represents compression of the actual value of the node. If more than one difference value is determined, then the difference value referred to in part 1108 is the difference value that will actually be stored. This difference value can be determined in accordance with a non-recursive or a recursive hierarchical encoding approach, or in accordance with a cellular interpolative prediction approach, as has been described in the preceding sections of the detailed description. The difference value is then stored for the node in lieu of storing the actual value of the node itself (1110), within the compressed representation of the CLUT on the computer-readable medium.

It is noted that for the non-recursive hierarchical differential encoding approach, the difference value for a node encodes a single difference of the value of the node in relation to a predicted value of the node, where the predicted value is determined based on values of one or more previous nodes that have already been received. For the recursive hierarchical differential encoding approach, the difference value recursively encodes a number of differences of the value of the node in relation to predicted values of the node, where the predicted values are determined based on values of one or more previous nodes that have already been received. For the cellular interpolative prediction approach, the difference value encodes a difference of the value of the node in relation to an interpolated value of the node, where the interpolated value is interpolated from values of more than one previous node that have already been received.

Finally, FIG. 12 shows as rudimentary system 1200 in relation to which embodiments of the present disclosure may be practiced. The system 1200 includes a computing device 1202 and a printing device 1204 that are communicatively connected to one another. The computing device 1202 may be a device that does not have inherent printing capability, while the printing device 1204 may be a device that does have inherent printing capability, like inkjet- or laser-printing capability.

The computing device 1202 has at least one processor 1206 and a computer-readable medium 1208, while the printing device 1204 also has at least one processor 1210 and a computer-readable medium 1212. Those of ordinary skill within the art can appreciate that both the devices 1202 and 1204 may and typically will have other components in addition to those depicted in FIG. 12. The computer-readable medium 1212 may be or include a hard disk drive, a semiconductor memory, and/or another type of tangible computer-readable medium.

The various methods that have been described herein can each be implemented as one or more computer programs stored on the computer-readable medium 1208 or 1212 for execution by the processor 1206 or 1210, respectively. In the specific example of FIG. 12, the computing device 1202 communicatively transmits a CLUT 1214 in a serialized node-by-node manner to the printing device 1204. The printing device 1204 compresses the nodes of the CLUT 1214 as they are received, in accordance with the non-recursive or the recursive hierarchical encoding approach, or in accordance with the cellular interpolative approach, that have been described.

We claim:

1. A non-transitory computer-readable medium having one or more computer programs stored thereon executable by one or more processors to perform a method to compress a color look-up table (CLUT) in a lossless manner, the method comprising:

receiving the CLUT in a serialized node-by-node manner, the CLUT comprising a plurality of nodes, each node converting a value of a first color space to a corresponding value of a second color space;

for each of some of the nodes of the CLUT, in an order in which the nodes of the CLUT are received in the serialized node-by-node manner, determining a difference value of the node from which the corresponding value of the second color space of the node is recoverable utilizing one or more of previously serialized nodes, in accordance with a hierarchical differential encoding approach or in accordance with a cellular interpolative prediction approach; and, storing the difference value in lieu of storing the corresponding value of the second color space of the node, to compress the corresponding value of the second color space of the node in the lossless manner, wherein the nodes of the CLUT are organized within a multi-dimensional volume having at least three dimensions, wherein the CLUT is received in the serialized node-by-node manner on a level-by-level basis over a plurality of levels from a coarsest level representing a greatest distance among nodes and a finest level representing a least distance among nodes, and wherein each level other than the coarsest level represents a sub-volume within the multi-dimensional volume.

2. The non-transitory computer-readable medium of claim 1, wherein the method comprises, for each of other of the nodes of the CLUT, in the order in which the nodes of the CLUT are received in the serialized node-by-node manner, storing a value of the node.

3. The non-transitory computer-readable medium of claim 1, wherein determining the difference value representing compression of the value of the node comprises determining the difference value representing compression of the value of the node specifically in accordance with a non-recursive hierarchical differential encoding approach, such that the difference value encodes a single difference of the value of the node in relation to a predicted value of the node, the predicted value of the node being predicted based on values of one or more previous nodes of the CLUT already received in the serialized node-by-node manner.

4. The non-transitory computer-readable medium of claim 1, wherein determining the difference value representing compression of the value of the node comprises determining the difference value representing compression of the value of the node specifically in accordance with a recursive hierarchical differential encoding approach, such that the difference value recursively encodes a plurality of differences of the value of the node in relation to predicted values of the node, the predicted values of the node being predicted based on values of one or more previous nodes of the CLUT already received in the serialized node-by-node manner.

5. The non-transitory computer-readable medium of claim 1, wherein determining the difference value representing compression of the value of the node comprises representing compression of the value of the node specifically in accordance with the cellular interpolative prediction approach, such that the difference value encodes a difference of the value of the node in relation to an interpolated value of the node, the interpolated value of the node being interpolated from values of a plurality of previous nodes of the CLUT already received in the serialized node-by-node manner.

6. The non-transitory computer-readable medium of claim 1, wherein one or more of the computer-readable medium and the processor are part of a printing device.

7. The non-transitory computer-readable medium of claim 1, wherein one or more of the computer-readable medium and the processor are part of a computing device that is communicatively connected to a printing device.

* * * * *